US006176616B1

(12) United States Patent
Joffe

(10) Patent No.: US 6,176,616 B1
(45) Date of Patent: Jan. 23, 2001

(54) MAGNETICALLY STABILIZED COUPLINGS AND BEARINGS FOR USE IN MECHANICAL DRIVES

(76) Inventor: Benjamin Joffe, 22314 James Alan Cir., Chatsworth, CA (US) 91311

(*) Notice: Under 35 U.S.C. 154(b), the term of this patent shall be extended for 0 days.

(21) Appl. No.: 08/480,561

(22) Filed: Jun. 6, 1995

Related U.S. Application Data

(63) Continuation of application No. 08/279,551, filed on Jul. 25, 1994, now Pat. No. 4,923,154, and a continuation of application No. 07/952,471, filed on Sep. 28, 1992, now Pat. No. 5,331,861, which is a continuation of application No. 07/532,743, filed on Jun. 4, 1990, now abandoned.

(51) Int. Cl.[7] ................................................... F16C 29/04
(52) U.S. Cl. ......................................................... 384/8
(58) Field of Search ................................... 384/8, 446, 49, 384/57, 50

(56) References Cited

U.S. PATENT DOCUMENTS

| 3,720,849 | * | 3/1973 | Bardocz | 310/8.1 |
|---|---|---|---|---|
| 5,001,351 | | 3/1991 | Boksem | 250/442.1 |
| 5,237,238 | | 8/1993 | Berghaus et al. | 310/328 |
| 5,380,095 | | 1/1995 | Pryor | 384/8 |
| 5,407,519 | | 4/1995 | Joffe et al. | 156/358 |

OTHER PUBLICATIONS unidentified authorship, "The Various Guiding Principles 1. *The Magnetic–Kinematic Principle*", unidentified scientific journal or textbook (circa 1987), p. 33.

* cited by examiner

Primary Examiner—Lenard A. Footland
(74) Attorney, Agent, or Firm—Ashen & Lippman

(57) ABSTRACT

A wobble-absorbing magnetic bearing for a drive system that applies force from a driving mover to move a driven object; said bearing comprising:
  a driving bearing element having a first surface;
  a driven bearing element having a second surface that faces the first surface along a drive direction;
  rolling elements disposed between the first and second surfaces to:
    enable the driving and driven bearing elements to move substantially freely, relative to each other, along at least one direction transverse to the drive direction.

20 Claims, 40 Drawing Sheets

Fig. 44
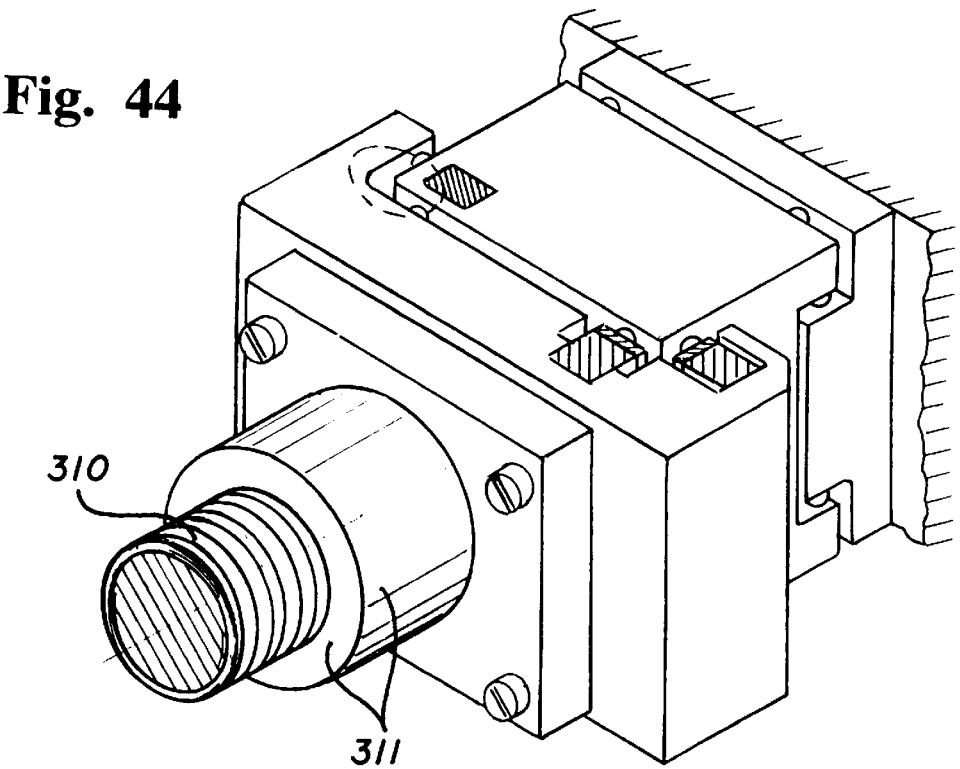
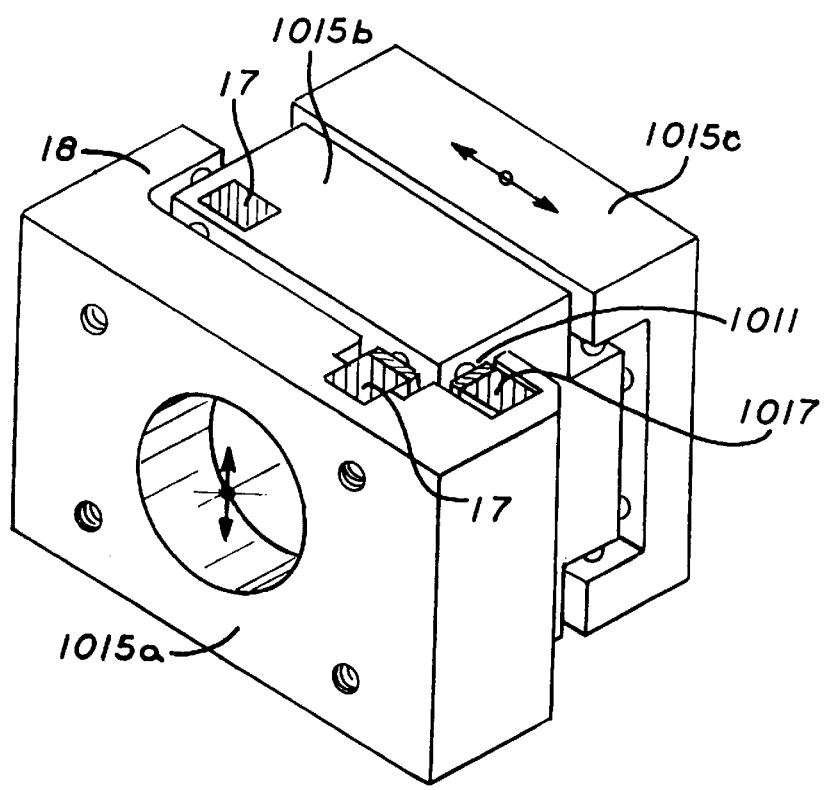
Fig. 45

MAGNETICALLY STABILIZED COUPLINGS AND BEARINGS FOR USE IN MECHANICAL DRIVES

RELATED APPLICATIONS

This is a continuation of application Ser. No. 08/279,551, filed as a continuation application on Jul. 25, 1994 of Ser. No. 07/952,471, and now issued as U.S. Pat. No. 4,923,154; and of its parent application Ser. No. 07/952,471, filed as a file-wrapper-continuing application on Sep. 28, 1992, and issued Jul. 26, 1994, as U.S. Pat. No. 5,331,861; which was a continuation of the grandparent application Ser. No. 07/532,743, filed Jun. 4, 1990, and now abandoned.

The application in its entirety is hereby incorporated by reference into this document.

BACKGROUND

1. Field of the Invention

The invention relates generally to mechanical drives for providing precision motion; and more specifically to bearings, couplings or other features that are stabilized magnetically, for use in such drives.

2. Related Art

Both of my earlier patent documents identified above teach use, in mechanical drives, of couplings or bearings that typically transmit linear motion along a drive direction. These couplings absorb lateral motions through rolling action of balls between coupling or bearing elements.

At least one of these elements is a magnet that retains the balls between the elements—and in some configurations helps keep the elements in line. The magnet also creates compressive constraint along the drive direction; this constraint prevents backlash.

The first of my two earlier patent documents identified above relates particularly to drives in which linear motion along the drive direction is derived from rotary motion about an axis parallel to that same drive direction. The second document relates to specific coupling configurations that typically transmit torque as well as longitudinal linear motion.

The present document is not limited either to the context of rotary drives or to the transmission of torque. For brevity and simplicity in this document some terminology is used in a manner that may be partially specialized:

The word "bearings" encompasses couplings that may sometimes operate in tension, as well as bearings per se.

The word "wobble" encompasses any spurious lateral motion such as lateral vibration, lateral play, and lateral jitter, as well as motions that are generated through rotation of a related shaft or screw and therefore perhaps more classically identifiable as wobble.

Accordingly, the lateral-motion-absorbing devices of my earlier patent documents as well as this one may be conveniently called "wobble-absorbing magnetic bearings", or "WAM" bearings—or simply "WAMBs". In this document, reference to such WAM bearings encompasses the varieties disclosed in those earlier patent documents as well as those disclosed here.

My earlier patent documents discuss an invention of Norris, a bearing with ferromagnetic balls that are held in place without a bearing spacer or bearing retaining-ring holder by making one of the bearing surfaces magnetic. Norris's bearing is not a wobble-absorbing drive bearing.

In addition to the art cited in, and in connection with prosecution of, my above-identified earlier patent documents, I have noted the following materials which may be of interest:

U.S. Pat. No. 3,720,849 Bardocz
U.S. Pat. No. 5,407,519 Joffe et al.
U.S. Pat. No. 5,380,095 Pryor
U.S. Pat. No. 5,237,238 Berghaus
U.S. Pat. No. 5,001,351 Boksem.

While dealing primarily with improving the positioning precision of a ball-mounted moving table through magnetic constraints, Bardocz does mention that backlash along a drive direction can be removed through magnetic constraint.

The Pryor patent may be truly termed the Pryor art, but by virtue of the earlier filing date of my '743 application the Pryor art is not prior art with respect to that part of the subject matter herein which is disclosed in my U.S. Pat. No. 5,331,861. Pryor too relates to magnetic constraint of moving tables, and analogous modules such as drawer slides, rather than drives; and as he says at the outset he is not concerned with extremely high precision.

Pryor uses individual balls that either slip in setscrew ball nests and roll on opposing surfaces, or bind in the nests and slip on the opposing surfaces, or slip both on the nests and on the opposing surfaces. None of Pryor's ball elements is fully rolling—i. e., able to roll at both sides of its interface.

Wobble in drive mechanisms can have both translational and rotational components. It is a problem in many types of drives, including the rotary-to-linear converters mentioned above, because it causes small but significant errors in the work process being performed.

FIGS. 1 and 2 illustrate representative errors in a particular type of linear drive that derives linear motion from rotary motion about an axis that is transverse, not parallel, to the drive-direction axis. Analogous errors will be found in rack-and-pinion or cable drives and virtually every other type of drive, including many that involve no rotation at all—for example magnetic, pneumatic, hydraulic and cam drives; and trigonometric and other bar linkages.

FIG. 1 shows a linear friction driver in which a servo-motor 214 mounts to a base 200 and rotates a motor shaft 211. A friction wheel 212 biases 213 a drive bar 210 against the motor shaft 211 so that operation of the motor 214 in either direction impels the drive bar 210 so as to move an attached object 218 such as a stage of a table.

The drive bar 210 is assumed to be straight, although in fact every physical object necessarily has some imperfections such as the sinuosity shown with great exaggeration in FIG. 2. The object 218 is assumed to be guided by a guideway 215.

As the guide bar 210 undergoes nominally pure longitudinal displacements Δx, as for example to positions 210' shown in the broken line, the object 218 is correspondingly displaced as for example to positions 218'. Deviations from straightness in the drive bar 210 introduce lateral displacements Δy, which are undesired as they degrade the precision of whatever process is the overall purpose of the system.

For instance suppose that the table supports a mechanical part to be machined, or an electronic chip on which multiple layers are being formed photolithographically, or a position-sensitive scientific measuring instrument. The machined surface or some chip layers or scientific measurements will be wrong by the lateral displacement Δy.

Efforts to eliminate such errors commonly take the form of (1) increasing the strength of the drive bar—which mainly has the effect of damaging the guideway 215 and increasing the overall weight, bulk and cost of the system—or (2) increasing the bias against the guideway, which mainly has the effect of damaging the guide bar 210 and aggravating the problem.

As FIG. 2 shows, a drive element in the course of its action may undergo spurious rotary motion too: in effect the drive system may be waving a drive bar 210, rotating it about a center near some controlling element e.g. 211–212. Furthermore such rotary motion is not most-typically limited to motion in a single plane (such as the plane of the drawing in FIG. 2), or particularly any plane that can be identified in advance.

The situation shown in FIG. 2 is also simplified in that like sources of error are often present in mechanisms associated with movements of the driven object 218. Therefore in particular rotary mismatches between motions of the drive bar 210 and driven object 218 may be compound—i. e., rotations about more than one center.

Analogous limitations will be found in every type of drive. As will be seen in detail later, these sometimes take the form of imperfections in a guide surface (such as 215), which can reflect back along the drive train to cause inaccuracy or damage.

All such drawbacks represent a pervasive problem in the art of mechanical drives.

SUMMARY OF THE INVENTION

My invention solves this problem easily, simply and inexpensively. In most instances it does so with only a minor increase in complexity of the apparatus.

According to the invention, no effort is made to remove either wobbling action or irregularities that are present in a drive member (or sometimes in a mating driven piece). Nevertheless adverse effects upon the workpiece or other movable object, and upon other elements of the system, are substantially eliminated.

These benefits are obtained through use of one or more WAM bearings, most typically but not always in-line with respect to the drive. A great many variations and refinements enhance both the precision and the practicality of these systems.

The character and advantages of the present invention will be more fully understood from the following detailed description, with reference to the accompanying drawings of which:

BRIEF DESCRIPTION OF THE DRAWINGS

FIG. 3A is a more-accurately drawn perspective drawing of a linear friction driver generally as in FIG. 3;

FIG. 43a is a perspective drawing of a cylindrical roller usable in the FIG. 43 device, but having a protective steel-sleeve facing;

FIGS. 44 and 45 are perspective views of a twenty-second preferred embodiment of my invention that provides a magnetic safety for a magnetically stabilized ballscrew drive.

DETAILED DESCRIPTION OF PREFERRED EMBODIMENTS

1. Basic Wobble-Absorbing Magnetic Bearings

Figure 1:
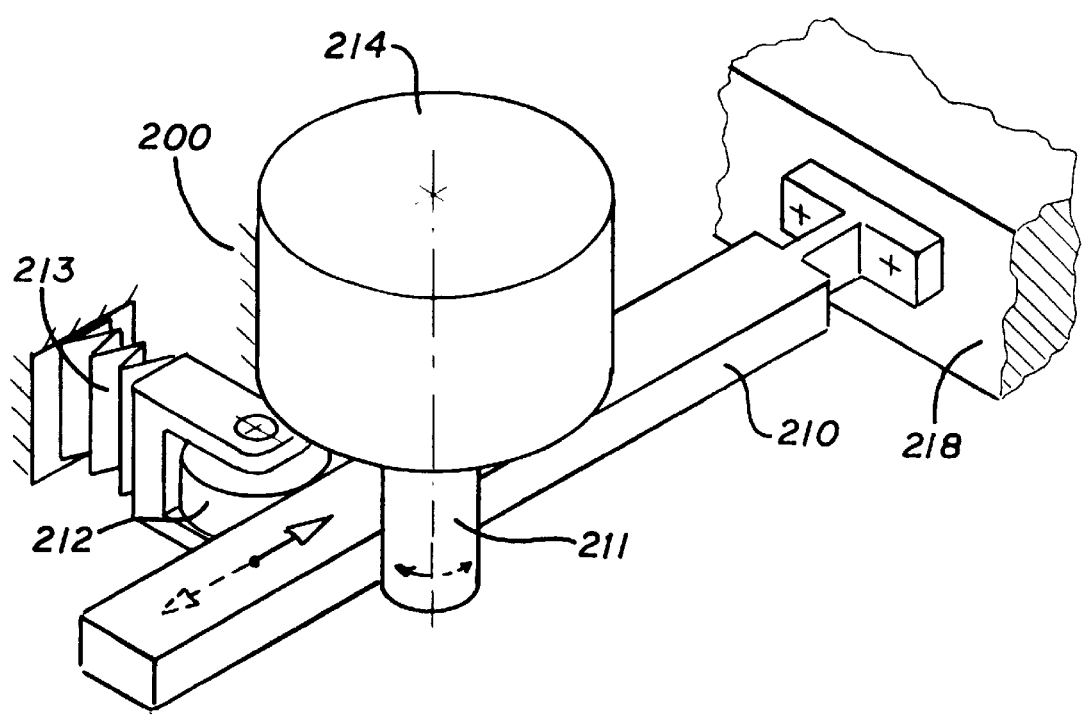
FIG. 1 is a very schematic perspective representation of a linear friction driver of the prior art.
Figure 2:
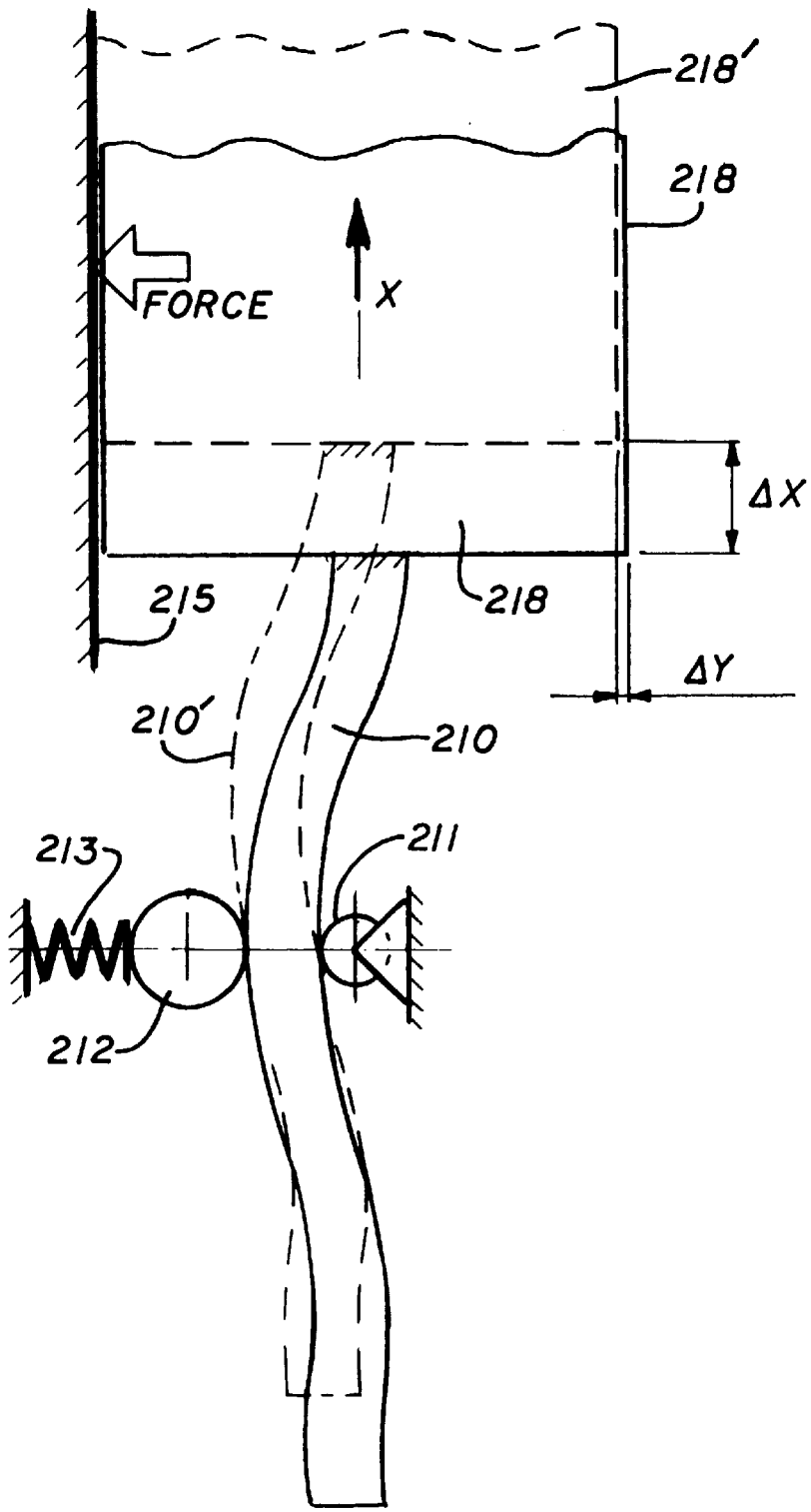
FIG. 2 is an even more diagrammatic plan view of the FIG. 1 prior-art driver.
Figure 3:
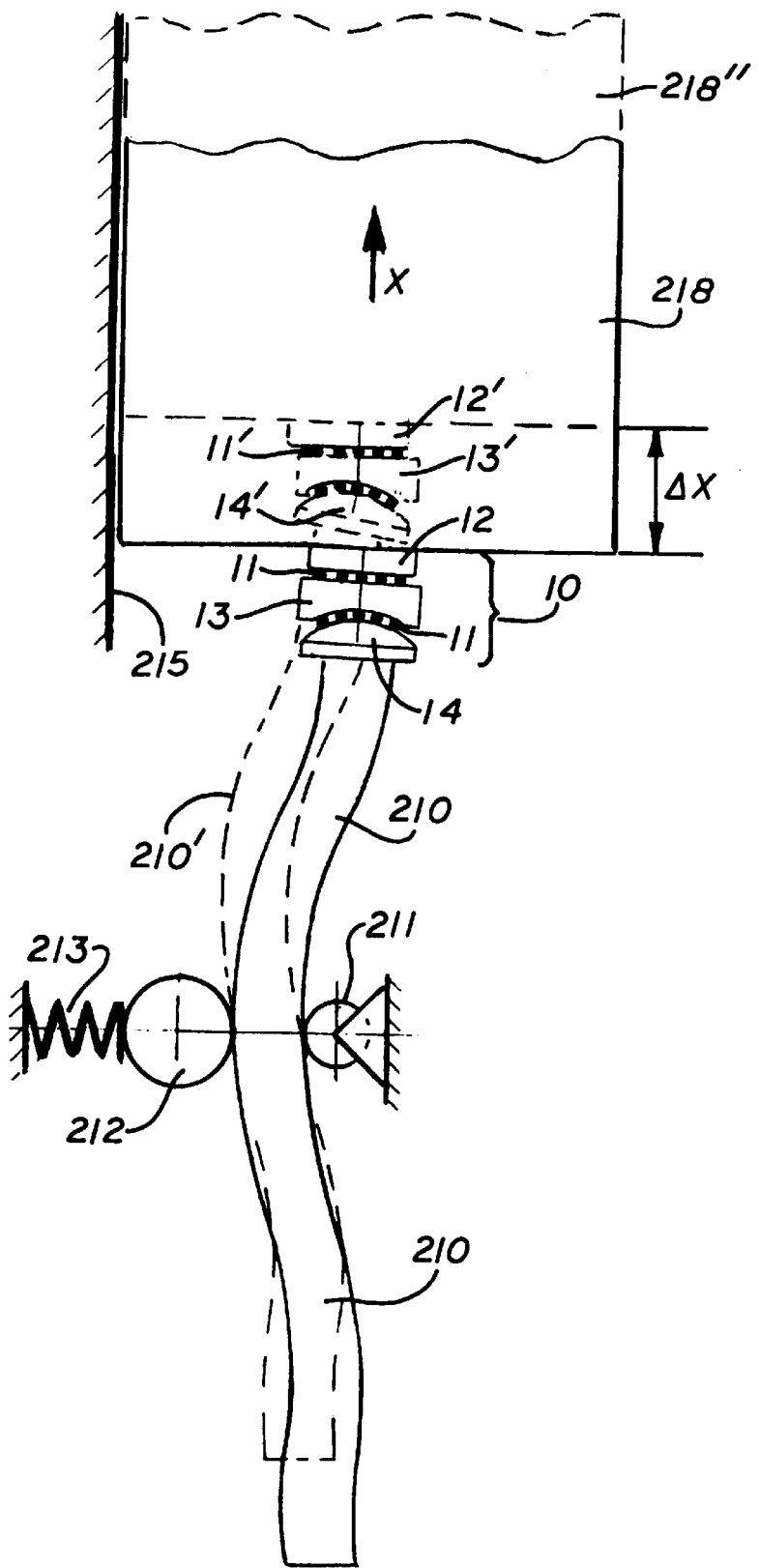
FIG. 3 is a like view of the same driver with a wobble-absorbing magnetic bearing (WAMB) according to preferred embodiments of my invention.

FIG. 3 shows the same system as prior-art FIGS. 1 and 2, but now with a WAM bearing 10 inserted between the drive bar 210 and the connection point to the movable object 218. The bearing 10 consists of at least two elements 12 and 13, or 13 and 14, that move laterally respect to each other and so permit lateral movement between the bar 210 and table 218.

The result is to isolate the object 218 from the effects of the imperfections in the bar 210. Now only the longitudinal displacement Δx is transmitted to the object 218, with no significant lateral displacement.

Balls 11 between the pairs 12–13, 13–14 of bearing elements enable this lateral movement to be smooth and nearly frictionless. The WAM bearing 10 is held together magnetically—as for example by making one 13 or more of the elements a permanent magnet—so that the additional interfaces introduce no longitudinal backlash, and so that (with suitable sizing) the elements tend to keep themselves mutually in line.

For most applications I prefer to use a permanent magnet for one 13 or more of the elements 12–14. As will be seen, however, the same overall results can be achieved by using a separate magnet to hold the WAM bearing 10 together, or by using an electromagnet (not shown), or by using spherical magnets for balls 11, or by using combinations of these tactics. All these variations have advantages in various special situations as where size, weight, cost, and dynamic performance are critical.

Planar surfaces 12 and 13 supply two translational degrees of freedom to the connection between the bar 210 and object 218: such a pair of elements suffices to accommodate purely linear elements of wobble. This is true even if the driven object 218 is at a slight angle to the theoretical drive direction.

In such situations, however, the true longitudinal position of the object 218 diverges (even more slightly) from the nominal. For highest precision, independent position measurements and corrective action may be desirable—e.g., either closed-loop operation, or keeping track of the actual position and making allowance for it.

As mentioned earlier, a drive element in the course of its action may undergo spurious rotary motion too. To accommodate such motion, the WAM bearing is advantageously made with another pair of elements 13, 14 whose surfaces are curved about a common center—for instance, cylindrical elements, providing one rotational degree of freedom to the connection between the drive bar 210 and driven object 218.

As also mentioned above such rotary motion is often not in a controllable or even identifiable single plane. Consequently to accommodate most of the common sorts of drive-element imperfection, curved elements 13, 14 in most applications are better made spherical.

An alternative, however, is to use cylindrical elements with crossed axes. Either option supplies two rotational degrees of freedom to the connection point between drive bar 210 and driven object 218.

(In accordance with standard practice in discussing practical systems, the terms "cylindrical", "cylinder", "spherical" and "sphere"—except where context otherwise indicates—refer to surfaces and articles that are formed as portions of cylinders and spheres, not necessarily entire cylinders and spheres, or that relate to cylinders and spheres. Thus for instance a "cylindrical axis" is the axis of a cylinder or part of a cylinder, a "spherical center" is the center of a sphere or part of a sphere, etc.)

In addition the situation of FIGS. 1 through 3 is simplified in that it takes no account of rotations about centers on the object side of the connection between bar 210 and object 218. Where a designer can reasonably anticipate—from the character of mechanisms on the object side—that such additional rotations may be likely, the designer should include additional curved surface pairs oriented oppositely from those 13, 14 in FIG. 3. Such enhancement supplies one or two additional degrees of rotational freedom to the connection.

On the other hand, in some situations it is desirable to restrict the number of degrees of freedom at the connection, in such a way as to accomplish other objectives—but without impairing the wobble-absorbing character of the basic WAM bearing. In particular, transmission of torque τ through a connection can be very important in drives, either to rotate a device on the driven side of a connection or to hold a device (most commonly a nut) on that driven side so that it does not rotate.

My earlier patent documents cover some such torque-transmitting WAMBs. This present document introduces other torque-transmitting WAMBs, or τ-WAMBs—and some refinements of those earlier ones.

My invention contemplates commercial availability of a variety of complete WAM bearings—ranging from simple translation absorbers 12–13, or simple one-sided rotation absorbers 13–14, to devices with more degrees of freedom as will be shown below—and also WAMB components from which complete WAM bearings can be quickly and easily assembled, to suit many different circumstances.

2. Elements Fully Rolling on Magnet Surfaces; Protective Facings and Procedures

In some forms of my invention, balls 11 are fully rolling along the surface or surfaces of one or more magnets 13. This feature appears in FIG. 3, and also in FIGS. 4 and 5. By "fully rolling" I mean that each ball rolls along both of the opposing surfaces between which it is captured. My invention is the first known WAM drive bearing that uses fully rolling balls.

Figure 4:
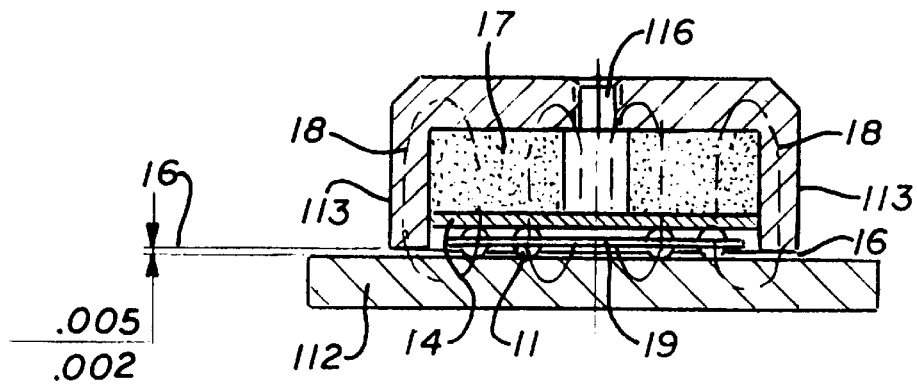
FIG. 4 is a cross-sectional elevation of a first preferred embodiment of an elementary annular or linear WAMB usable as one element pair or stage of the WAMB in the FIG. 3 driver (the WAMB has a ceramic magnet that is protected from its rolling elements by a surface facing, and a case that surrounds the facing as well as the magnet)
Figure 5:
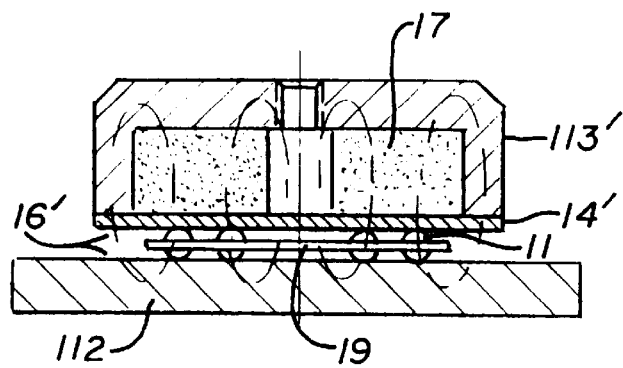
FIG. 5 is a like view of a second such preferred embodiment of a WAMB usable in the FIG. 3 driver (this WAMB has a case that surrounds the magnet but not the facing)

FIGS. 4 and 5 illustrate that when balls 11 roll on the surfaces of some magnets 17 the magnet surfaces are advantageously protected by facing plates or sheeting 14, 14'. I have discovered that this is preferable particularly for magnets of ceramic materials, because they are relatively brittle and subject to cracking if dynamically loaded. Modern-day magnets of the highest strengths are made of such materials. The protective facing 14, 14' may be preferably ferromagnetic material, such as hardened steel, that is very hard but not too brittle.

Figure 6:
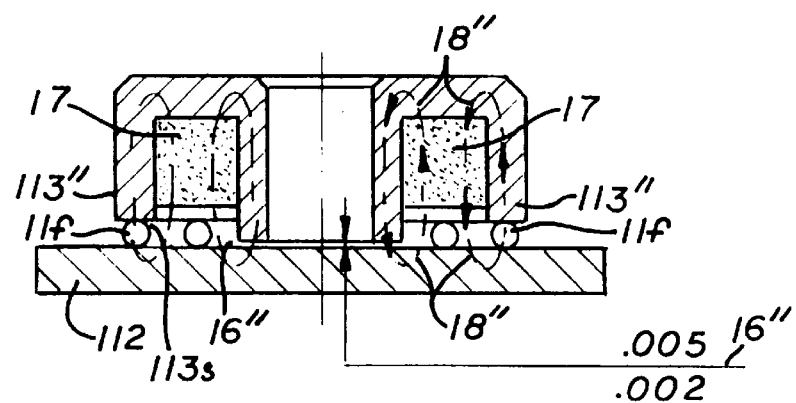
FIG. 6 is a like view of a third such preferred embodiment (in this WAMB the rolling elements do not mechanically load the magnet, and there is no surface facing)

In addition, as to assemblies such as those in FIGS. 4 and 5, I have found that it is very important to avoid shipping such assemblies under load. (Even assemblies such as that in FIG. 6 are less likely to crack; but for conventionally known reasons—to avoid distortion of the balls 11f or bearing surfaces 112, 113s—are still best shipped unloaded.)

From the foregoing discussions of FIGS. 1 through 5 it will be clear that the device of FIG. 5 is a drive bearing—i. e., a bearing for insertion in a drive train or system that can apply force from a driving mover 110' to move a drive object 118' The bearing includes a driving bearing element 113'–14' with which several features are associated: a cup-shaped shell 113', a threaded hole 116', a magnet 17, and a facing 14'. This driving bearing element 113'–14' has a first surface 114'.

The bearing also includes a driven bearing element 112 which has a second surface 112' that faces the first surface along a drive direction $\underline{x}$. Rolling elements 11 are disposed between the first and second surfaces.

These rolling elements 11 enable the driving and driven bearing elements 113'–14' and 112 to move substantially freely, relative to each other, along at least one direction $\underline{y}$ transverse to the drive direction $\underline{x}$. The rolling elements 11 transmit drive forces along the drive direction $\underline{x}$ from the driving bearing element 113'–14' to the driven bearing element 112.

The tapped hole 116' serves as means for receiving driving contact from the driving mover 110', at the driving bearing element 113'–14'. Edges 112" or other portions of the plate or driven bearing element 112 in turn apply driving contact from that driven element to the driven object 118'.

The magnet 17 applies magnetic force to hold the bearing elements 113'–14', 112 together. The magnet 17 thus serves as means for applying magnetic force to hold the bearing elements together against the rolling elements 11.

Alternatively, since the bearing of course can be impelled from either end, the assignments of terminology presented above can be simply reversed—in other words, the driving mover may be the object 118', the driven object the rod 110', the driving bearing element the plate 112, and the driven element may be the cup assembly 113'–14'.

3. Nonferromagnetic Rolling Elements

Since the Norris bearing used magnetic elements merely to hold the balls in position without a spacer or retainer, and this function can be performed only if the balls are of ferromagnetic material, i. e. material with a significantly high magnetic permeability, my invention is the first known magnetic bearing that can use nonferromagnetic balls.

The benefits of such usage will be outlined shortly. The balls must be positioned with a retainer 19.

4. Basic Configurations of Wobble-Absorbing Magnetic Bearings

As shown in the configuration of FIG. 4, extremely high magnetic force can be achieved by using a steel case 113 that encloses the facing 14 of the magnet 17, as well as the magnet 17 itself, and that extends very close to the opposing steel-plate bearing surface 112. This configuration can be either annular or linear. The high force arises through tight coupling of the toroidal magnetic-flux path 18—by virtue of the fine airgap 16 between the base of the steel case 113 and the opposed steel plate 112. High force is desirable for two reasons:

It eliminates backlash very effectively. It also maintains—even during pulling action—the linkage between a drive element that may be attached at a threaded hole 116 in the case 113 and a driven element that may be attached to or integral with the ferromagnetic plate 112.

The force can be made particularly high by using ferromagnetic balls 11, in which event the retainer 19 is preferably omitted. With such material the magnetic flux 18 is closed directly through the balls 11, and there is virtually no airgap under the annular magnet 17. The low airgap also minimizes magnetic-flux splash which may influence sensitive equipment nearby.

On the other hand only a limited amount of lateral (radial, in an annular device) motion can be accommodated in the FIG. 4 configuration before the interior of the case 113 stops the balls 11 (or retainer 19 if present). Greater lateral travel is permitted by instead terminating the side walls of the case 113' above the facing 14', as shown in the alternative annular or linear configuration of FIG. 5, and extending the facing laterally to cover the bottom of the case 113'. The balls can now roll further laterally, but at the cost of a coarser airgap 16' and correspondingly lower magnetic force, and greater flux leakage to the environment.

The FIG. 6 annular configuration accepts very little lateral motion as the balls 11f can roll only under the peripheral rim. (The balls visible in the drawing at intermediate positions radially between the center column and peripheral rim are at the far edge of the device.) It does, however, have advantages:

Since the balls do not roll on the magnet 17, it requires no facing 14, 14'. It also incidentally can be made as shown with a central through-hole for visual or contact access to the opposing steel plate 112 (or, with a hole through that plate, access to items on the other side). The FIG. 6 configuration is best practiced with ferromagnetic balls 11f, as these tend to hold themselves in place under the narrow rim 113".

The FIG. 6 device has a fine airgap 16" about its center column, and can close the magnetic loop through the balls 11f along the periphery. For this purpose, particularly if flux splash is undesirable, it is best to use small balls (small spacing between the bottom rim 113" and opposing plate 112) and to put in enough balls to fill at least 50% and preferably up to 95% of the peripheral distance. In other words, for this purpose the balls should be spaced apart by a distance between $1/19$ and 1 times their diameter. To the extent that magnetic strength and flux splash are relatively less important and load-carrying strength is relatively more important, the balls can occupy preferably only 20% to 50% of the periphery.

The FIG. 6 flux pattern is toroidal—toroidal (i. e., within each radial sector as illustrated a toroidal pattern 18" that wraps toroidally around the centerline of the assembly), and can be further enhanced by providing an annular facing with a fine gap under the center (annularly) of the magnet.

The configuration of FIG. 6 can also be made in a linear equivalent, with a central slot. In the linear variant if the case 113" is not continued along the end surfaces then no intermediate balls, such as seen in FIG. 6 under the magnet 17, would be visible.

5. Magnetic Induction Considerations and Choice of Rolling-Element Materials

Figure 7:
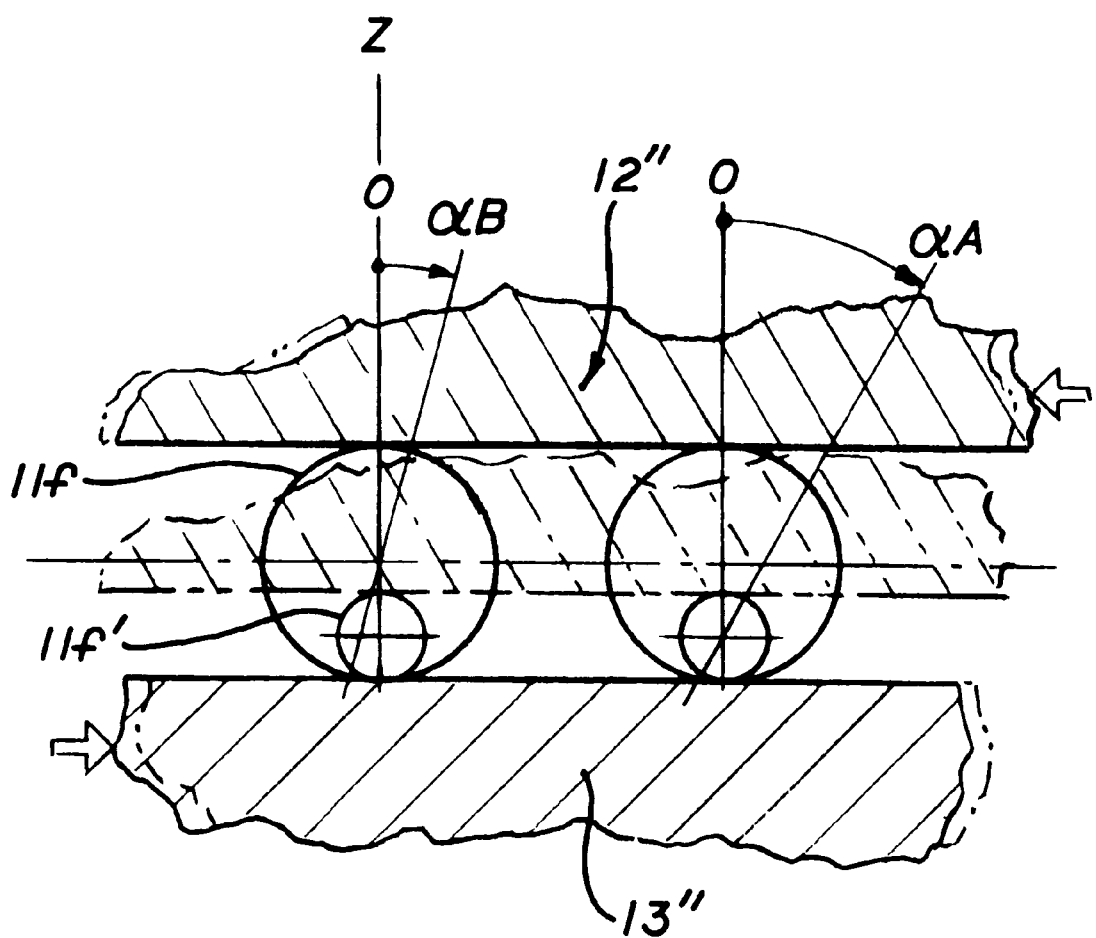
FIG. 7 is a diagrammatic representation of rolling elements of two different sizes between two clamping surfaces.

When ferromagnetic rolling elements 11f or 11f'—either balls or cylinders—are clamped between two magnets, or between two surfaces one 12" of which is magnetized and the other 13" of which is ferromagnetic, magnetic domains tend to be induced in the rolling elements 11f', 11f'—which thereby tend to become magnets themselves. In other words, magnetic poles S and N (FIG. 7) in the adjacent clamping surfaces 12", 13" tend to induce magnetic poles N' and S' respectively in the rolling elements 11f', 11f'. As shown, the induced poles N', S' are aligned with the surface normals, identified in FIG. 7 as the z axis.

If the rolling elements 11f', 11f' are already magnets, then an analogous situation may arise in the opposite sequence: when first placed on either adjacent surface (say the lower one in FIG. 7), the rolling elements mechanically, bodily align themselves with their poles parallel to the z axis. Then small magnetized pole areas N or S (depending on alignment of the rolling-element magnets) tend to be induced in the adjacent surface by magnetic flux from the poles S' or N' of the rolling elements. Then when the other clamping surface is positioned (say the upper one in FIG. 7) in contact with the rolling elements, poles S or N tend to be induced in that surface too.

Now as the surfaces undergo relative motion x (FIG. 7) and the rolling elements actually begin to roll, the induced or permanent poles in the rolling elements 11f, 11f' roll (or "rotate") out of alignment with the z axis. The result is to tend to weaken, at least temporarily, the magnetic clamping of the two clamping surfaces.

If the rolling elements are soft ferromagnetic material the magnetic domains can realign themselves relatively quickly, and the clamping force may not be significantly reduced unless the motion is extremely rapid. Nevertheless there is an adverse effect: eddy currents associated with the changing flux and domain directions heat the rolling elements, which heat the adjacent surfaces.

As a result both the rolling devices and clamping surfaces become subject to dimensional changes, which may be differential as these various phenomena are sensitive to edge effects and other geometrical influences. The heating and dimensional shifts can degrade positional precision.

Therefore in situations where lateral motion is expected to be relatively very constant or rapid, or both constant and rapid, it is advisable to calculate or experimentally determine the eddy-current induction and thermal effects expected, and adjust dimensions and tolerances accordingly. In extreme cases it will be preferable to avoid all these effects by using rolling elements of nonmagnetic materials such as ordinary ceramic—with a retainer to keep the rolling elements in position.

Figure 8:
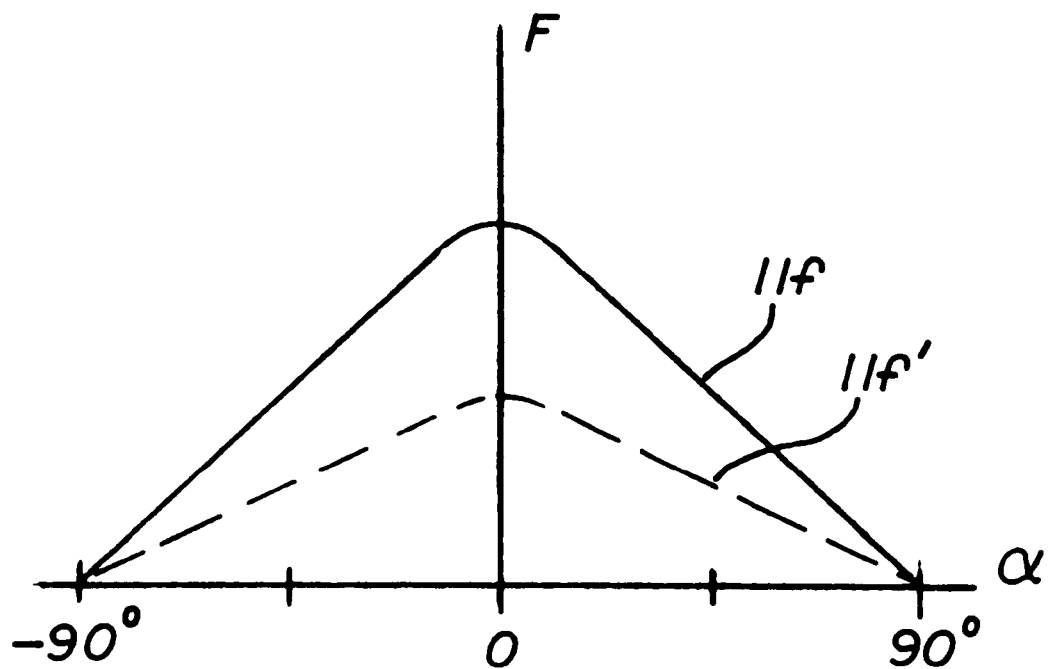
FIG. 8 is a graph showing force relationships in the FIG. 7 rolling elements and surfaces.
Figure 9:
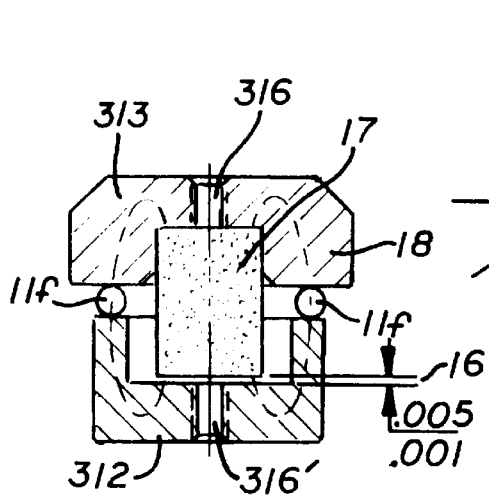
FIG. 9 is a cross-sectional elevation of a fourth preferred embodiment of an elementary annular WAMB usable as one element pair or stage in a drive system; the elements of the WAMB are shown mutually centered.
Figure 9A:
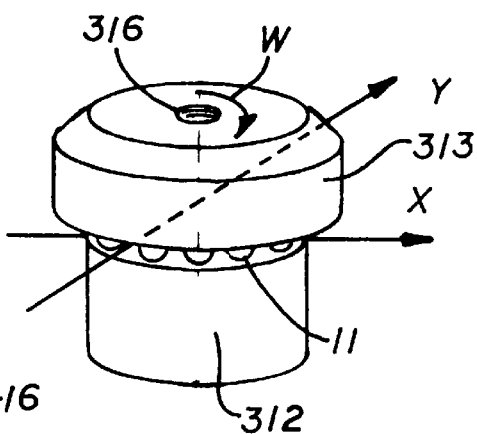
FIG. 9*a* is a simplified perspective view of the FIG. 9 WAMB.
Figure 10:
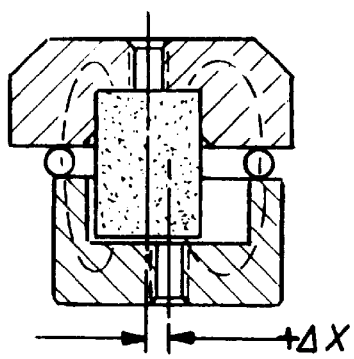
FIG. 10 is a view like FIG. 9 but with the elements off-center in a first direction.
Figure 11:
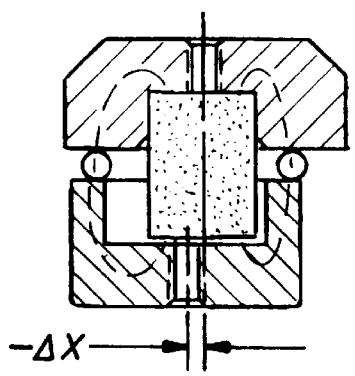
FIG. 11 is a like view but with the elements off-center in the opposite direction.

If the rolling elements are instead relatively hard ferromagnetic material, then clamping force tends to decrease significantly with rolling angle a (FIG. 8) away from the z axis as shown. Only if the rolling speed is extremely slow, or total angular excursion a does not exceed perhaps some 70°, can the magnetic induction effects be kept small enough to maintain adequate magnetic clamping. For any given lateral displacement x, the rotational component $\alpha_A$ of motion, during rolling, for a larger ball 11f is smaller than the corresponding rotational component $\alpha_B$ for a smaller ball 11f'—and therefore is less subject to loss of clamping strength through misalignment in rolling.

Moreover even a moderate speed of rolling, with these harder materials, is likely to produce excessive heating as the rolling elements electrically resists realignment of their magnetic domains. Hence for these various reasons harder materials are to be avoided where significant motional amplitude or velocity are expected, though they are otherwise preferable for the greater clamping forces and flux-splash control which they confer on a WAM assembly.

Proceeding onward along the spectrum of soft to hard initially-unmagnetized but ferromagnetic materials and now to assemblies using permanent metal magnets as the rolling elements: as will be understood from the foregoing discussion, if permanent magnets are in use the system parameters must be selected to strictly limit rolling angular excursion well below 90°, lest clamping force be lost entirely. Even within this constraint if relatively high motional amplitude or speed arises odd effects may follow as the rolling-element magnets generate eddy currents and induced magnetic forces tending to resist the motion.

Some relief from limitations related to heating may be obtained using ceramic magnetic rolling elements, as these are less susceptible to passage of eddy currents and resulting ohmic heating. Ceramic balls and rollers, however, like ceramic pole magnets are subject to cracking if dynamically overloaded.

Ceramic rollers can be shrink-fitted with steel jackets to minimize this problem, though at some expense. Ceramic balls, however, as a general rule should be reserved for very delicate or specialized equipment in which they can be protected from abrupt stress—and in which their special compactness, mechanical hardness, chemical properties and the like are particularly helpful.

FIGS. 9 and 9a through 11 represent a steel-jacketed annular WAM bearing that can accommodate small lateral motions with a minimum of restoring force. This characteristic arises from the oversize (preferably by a factor of roughly 1.2 to 1.5) mating surface of one element 313 relative to the other 312.

Restoring force between WAMB elements generally arises through edge effects as adjacent elements move out of mutual alignment. In the FIG. 9 bearing, because the balls 11f roll to their extreme leftward (FIG. 10) or rightward (FIG. 11) extreme positions on the annular lower rim before closely approaching either the outer edge of the significantly oversize element 313 or the magnet 17 within that oversize element at its center, edge effects are not encountered.

The practical considerations of sheathing 14, ball-material, gap 16 and transverse motion outlined above with respect to the planar-surface configurations of FIGS. 4 through 8 are applicable as well to curved surfaces such as the surfaces of the curved elements 13, 14 in FIG. 3. Also for clarity these practical considerations have been illustrated with respect to relatively simple two-element WAM bearings but are equally applicable to multielement WAM assemblies such as will now be introduced.

2. Compound Wobble-Absorbing Magnetic Bearings with and without Torque Transmission FIGS. 12 through 18 illustrate representative bearing assemblies 410 for use in a variety of circumstances. They are made up of a relatively small number of standard elements, but through selection of these elements they can produce a customized WAM function to suit the situation at hand.

Figure 12:
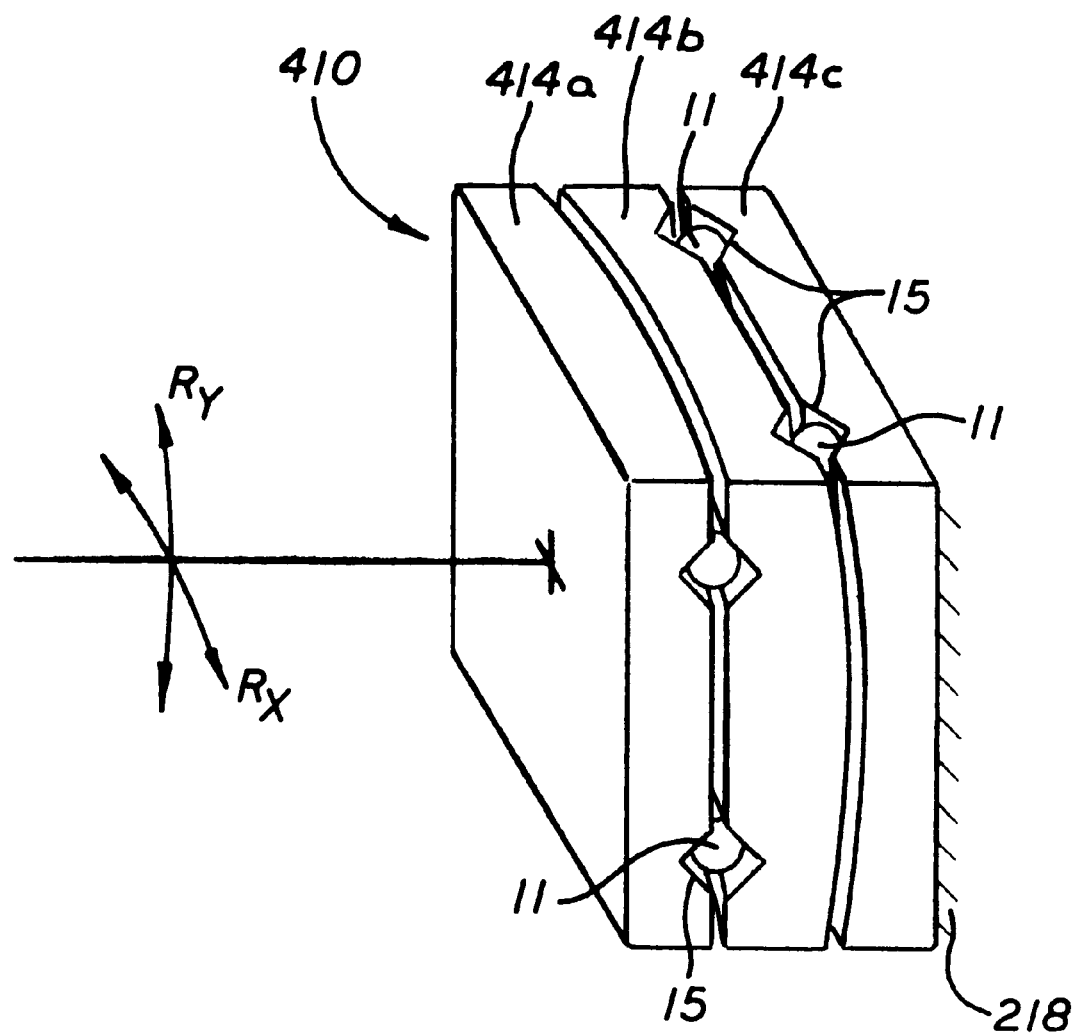
FIG. 12 is a somewhat diagrammatic perspective of a fifth preferred embodiment of a representative two-stage WAMB or (with optional V-grooves) τ-WAMB, having crossed cylinders both curved about axes off in a common direction.
Figure 13:
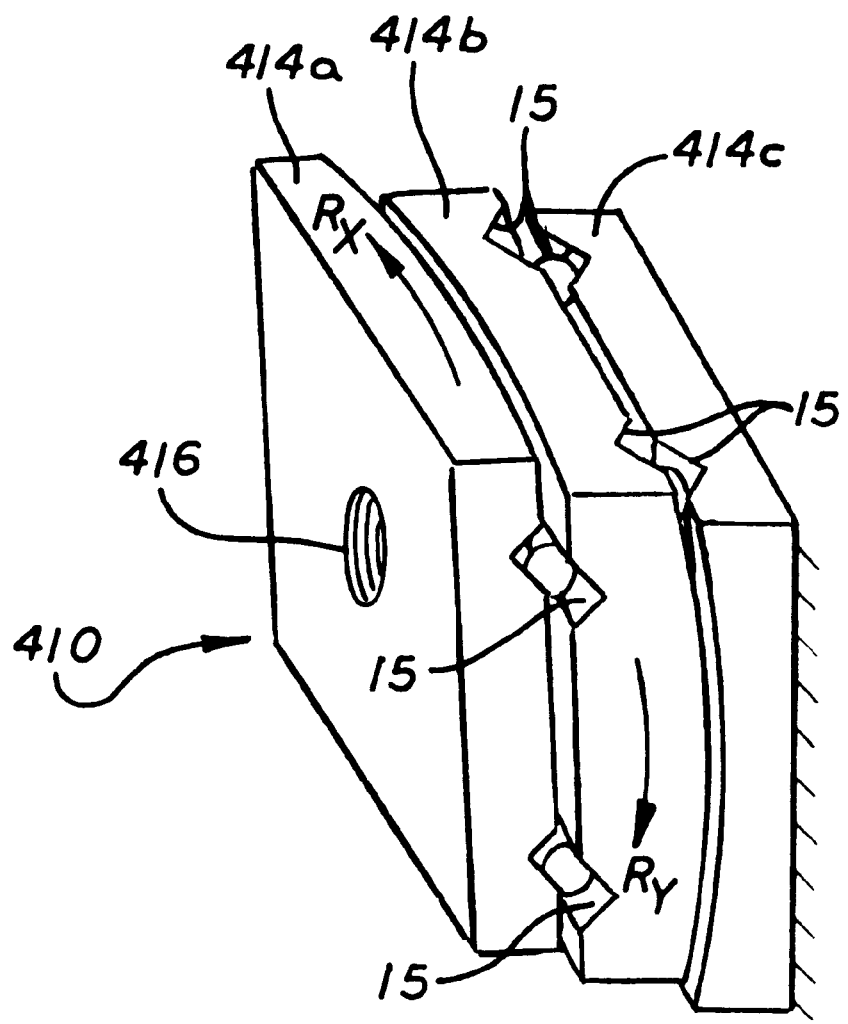
FIG. 13 is a like view of the FIG. 12 device with its elements mutually offset.
Figure 14:
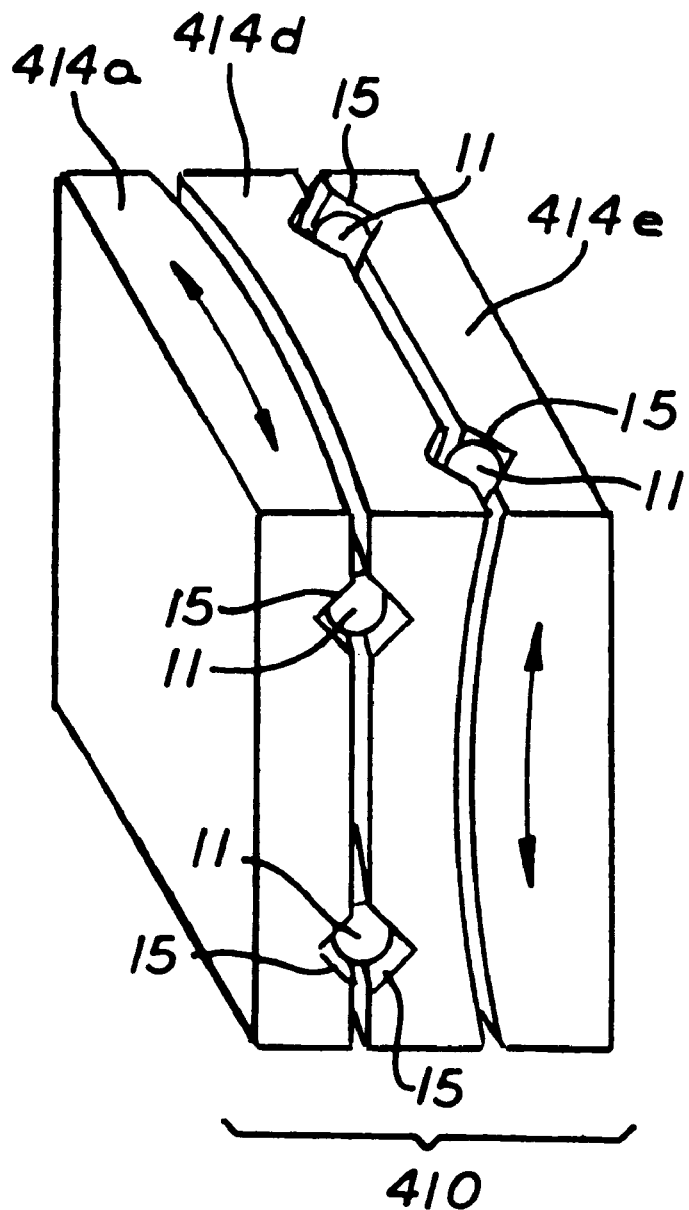
FIG. 14 is a view like FIG. 12, but of a sixth preferred embodiment of another representative WAMB or τ-WAMB, having tongue-and-groove construction.

FIGS. 12 and 13 show balls 15 riding between V-shaped grooves 15 formed in two pairs 414a–b, 414b–c of conformal cylindrical surfaces. As will be explained shortly, the grooves 15 may be regarded in a sense as optional; the balls could be clamped directly between the cylindrical surfaces.

The term "conformal" here means that each pair of cylinders has a respective common axis, though as can be seen the two axes of the two pairs are not common but crossed: the leftward pair 414a–b accommodates relative rotation $R_X$ about a vertical axis, and the rightward pair 414b–c accommodates relative rotation $R_Y$ about a horizontal axis.

Although the cylinder pairs are oriented with their cylindrical axes crossed, the axes are offset outside the bearing in a common direction (to the left, as drawn). Therefore these two interfaces, as suggested earlier, might substitute for a single spherical interface—but for the V grooves.

In the case of the particular configuration of FIGS. 12 and 13, however, without the V grooves the performance would be nearly identical to performance using a spherical WAMB. A subtle but sometimes important difference could be introduced by using different radii of curvature for the two cylinders, for the following reason.

A sphere-plus-plane combination (FIG. 3) or a cylinder-plus-plane combination (e.g., third and fourth elements 414g–h in FIG. 17) is particularly efficient in accommodating rotational wobble about some effective center of rotation whose distance from the bearing happens to equal the radius of curvature of the cylinder or sphere. All the motion is taken up in relative rotation of the spherical or cylindrical elements, and the planar elements idle unless there is transverse linear wobble too.

As the center of rotation of the wobble is assumed to be at distances progressively more-divergent from the WAMB radius, the planar stage must make a progressively increasing contribution—constantly rolling, through progressively larger amplitudes, back and forth in a sinusoidal fashion to absorb the increasing mismatch between the spherical radius and the actual distance to the effective pivot. The bearing will accept this operation, and the life of a WAM bearing is very long since it compensates (by magnetic attraction) for its own wear to a considerable extent.

Nevertheless this constant hunting—to provide a second-order but large-amplitude adjustment—may not be regarded as ideal, and system designers may wish to minimize it. (For example, as pointed out above, excursion amplitude does exert constraints on selection of rolling-element materials and sizes.)

Therefore if the effective pivot distance and orientation of the wobbling motion can be discovered (by calculation or measurement) before establishing a final WAMB configuration, it may be desirable to select a WAMB surface whose radius of curvature matches the effective pivot distance. In addition, if the choice is a cylindrical WAMB element pair the axis of the WAMB pair should be aligned (about the system longitudinal axis) with the major axis of the wobble.

Now it can be seen that if a designer expects, or finds, wobble in two different directions arising about two different effective pivot points at different distances from the bearing, the designer may prefer to try to match both distances, with two different WAMB surface pairs respectively. If the two lateral axes of the two wobble directions are not stable, or if they are at awkward angles to each other, two spherical WAMB sets in series could be used. If the two lateral axes are stable and crossed at 90°, however, the FIG. 12 combination could serve nicely—and would do better than a single sphere.

Such a WAMB would be somewhat more efficient than a sphere-plus-plane combination (FIG. 3) in relieving wobble in the two different directions, expected to arise about two effective pivot points at respectively different distances from the bearing, since the sphere-plus-plane combination would require constant back-and-forth rolling at the planar stage, in at least one direction, to absorb the mismatch between the spherical radius and the actual distance to the effective pivot.

7. Torque-Transmission Features

As mentioned above, the V-grooves 15 may be considered as optional in a sense. They are important, however, when it is desired to transmit relatively high levels of torque through the WAMB sandwich.

Since the cylindrical axes of the two WAM-element pairs 414a–b and 414b–c in FIG. 12 are crossed, the cylindrical surfaces themselves are capable of transmitting torque, even without the V-grooves. This is explained at some length in my earlier patent documents, in conjunction with a crossed-cylinders combination in which the cylindrical axes are offset in opposite directions from the bearing—as in FIG. 14 of the present document. Furthermore a crossed-flanges configuration, particularly covered in my second above-discussed patent document, also can be used to transmit relatively high torque levels. Therefore all of these units alike may be regarded as τ-WAM or torque-transmitting wobble-absorbing magnetic bearings.

Relative to crossed cylinders, however, the V-groove forms of FIGS. 12 through 18 provide relatively much higher torque levels. Relative to crossed flanges, the V-groove forms offer a relatively more-compact geometry and more-symmetrical internal forces acting closer to the system axis (but in small quantities are more costly to make). Therefore the V-groove variants have distinct advantages over the other τ-WAMB devices.

Where V-grooves are formed in cylinders, as shown in FIG. 12 through 18, the grooves may be seen as partly redundant relative to the cylinders: a groove running horizontally in the left-hand stage 414a–b in FIG. 12, for example, removes the same vertical-sliding degree of freedom as does the cylindrical surface of the right-hand stage 414b–c. The opposing V-groove surfaces in the left-hand interface, however, mutually engage at a steeper angle and so more effectively transmit large vertical forces than the shallowly angled cylindrical surfaces in the right-hand interface. Similar observations can be made for the other V-grooves and cylinders in the drawing, relative to horizontal forces.

As to V-grooves in planar-surface interfaces, naturally the grooves limit degrees of freedom in a way which cannot be achieved at all with planar surfaces normal to the drive axis. Thus V-grooves in the planar interfaces 414g–h and 414h–i in FIG. 17 enable torque transmission comparable to that obtained with the crossed-flanges configuration covered in my second above-mentioned patent document.

Figure 15:
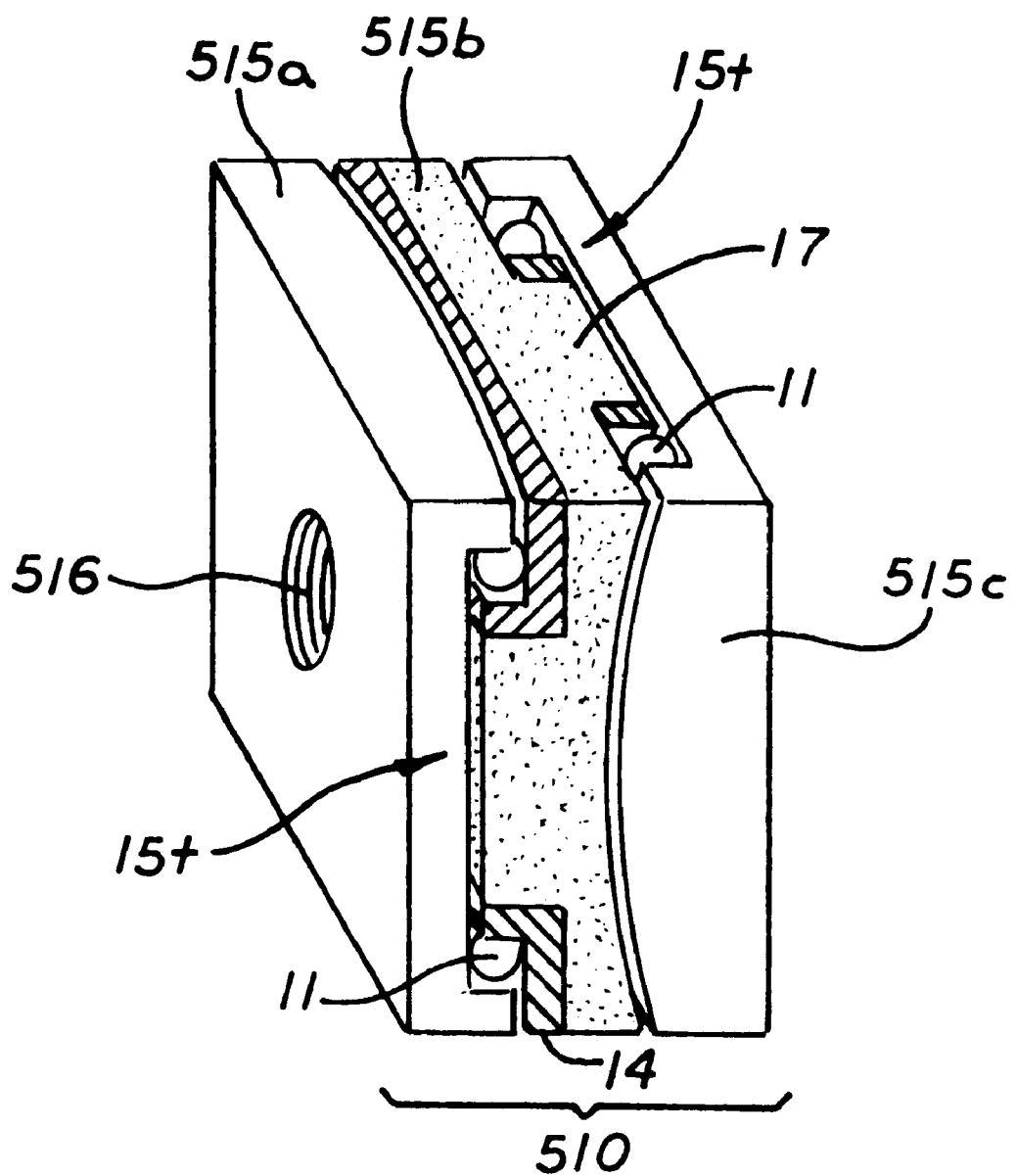
FIG. 15 is a like view of a seventh preferred embodiment having crossed cylinders curved about axes off in opposite directions.
Figure 16:
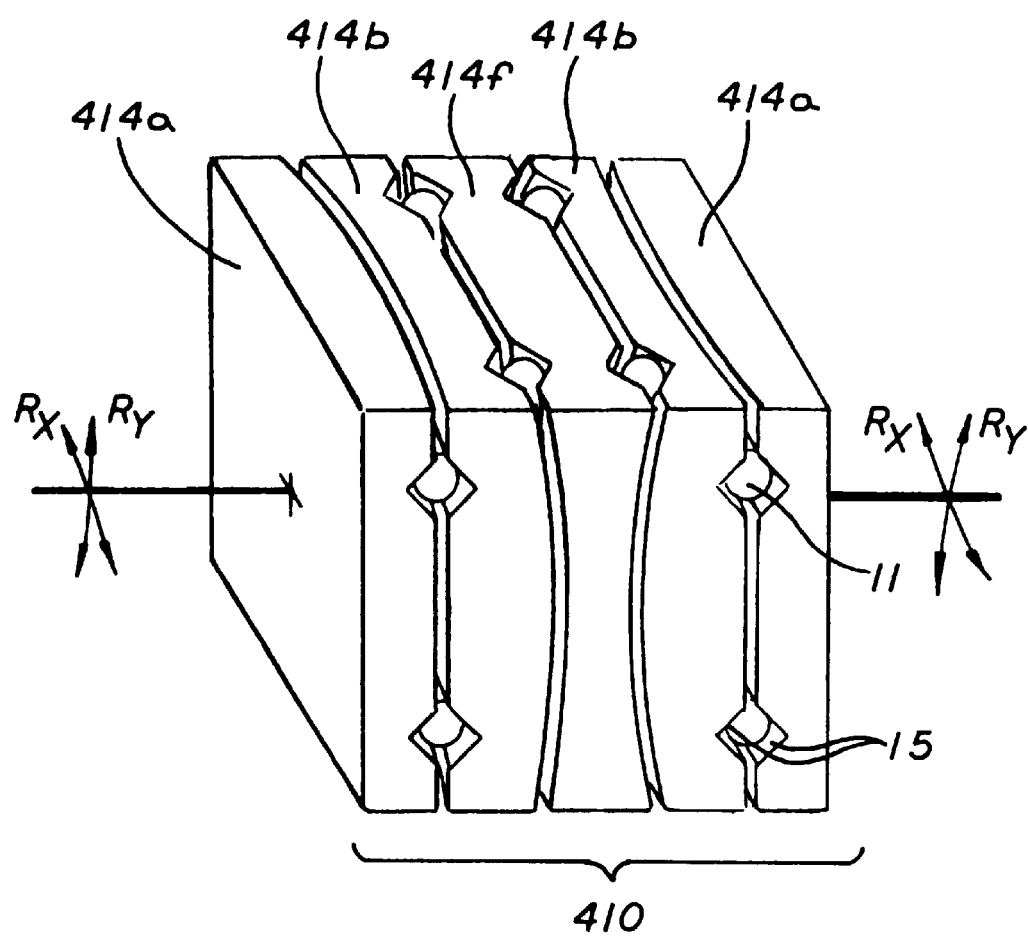
FIG. 16 is a like view of an eighth preferred embodiment of a four-stage (five-element) WAMB having two crossed cylinders curved about axes off to the left, and two curved about axes off to the right.
Figure 17:
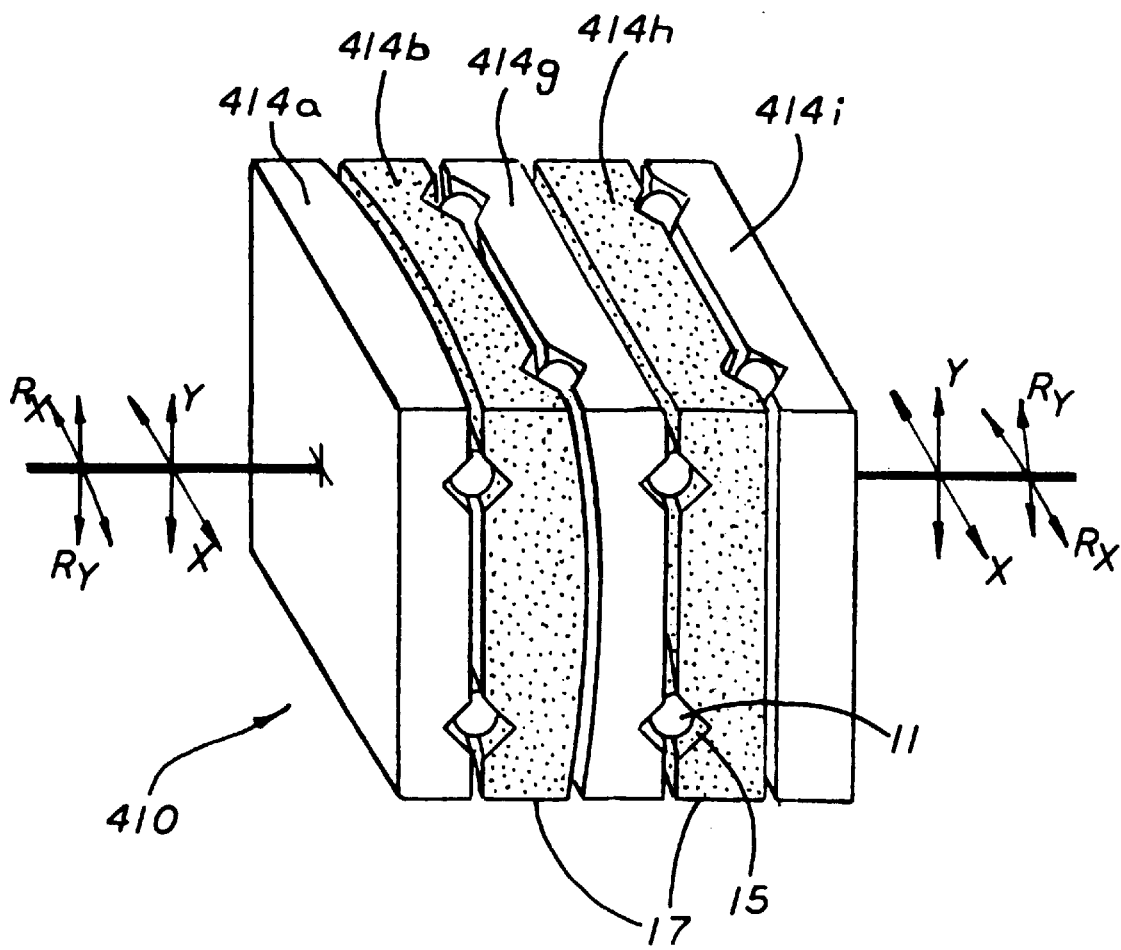
FIG. 17 is a a like view of a ninth preferred embodiment having two crossed cylinders curved about axes off in a common direction and two planar stages.

V-grooves are not the only means of imparting higher torque-carrying capability to crossed-cylinder WAMB sets. A ball-separated tongue-and-groove form can be used instead, as shown in FIG. 15.

Where centers of rotational wobble are thought to exist at both sides of the WAMB, two spheres centered at the two sides can be provided. If a τ-WAMB is desired, spheres cannot be used but two crossed-cylinder pairs can be employed instead—with the curvatures of the two pairs centered at opposite sides of the WAMB as in FIG. 16. FIG. 17 shows a τ-WAMB analogue of the torque-nontransmitting FIG. 3 plane-and-sphere WAMB with no grooves.

8. Simple External Magnets Imparting or Augmenting Magnetic Force

Some benefits of my invention may be obtained, in some circumstances, even using drive bearings that were made without recognition of the benefits of my invention. For instance a completely conventional, complicated drive bearing (FIG. 18)—one with, for example, adjustable V-grooves as shown—can be clamped by a magnetic overall-enclosure clamp or bearing house, compressing all the ball contact points to eliminate backlash and obtain many of the advantages of the instant invention.

Figure 18:
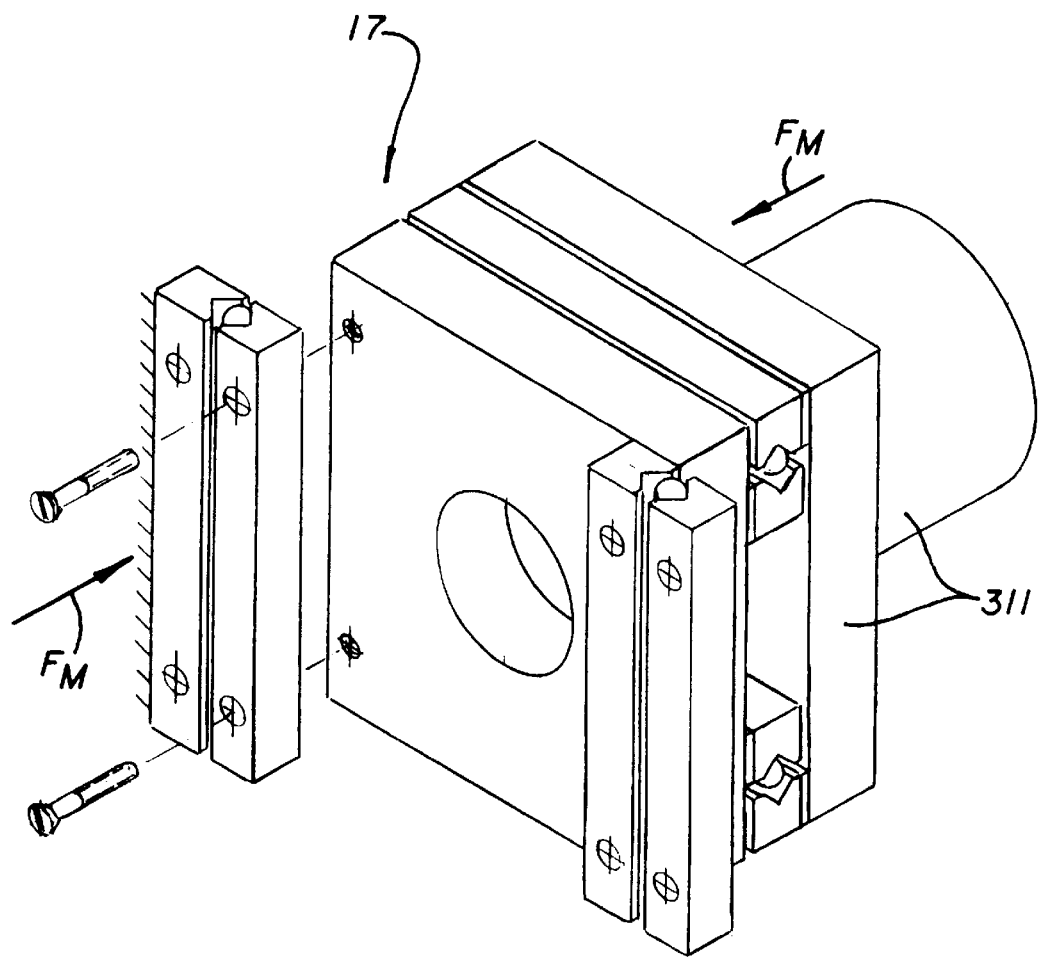
FIG. 18 is a rough perspective view of a prior-art drive bearing (having no magnetic features) for a ballscrew nut.
Figure 18A:
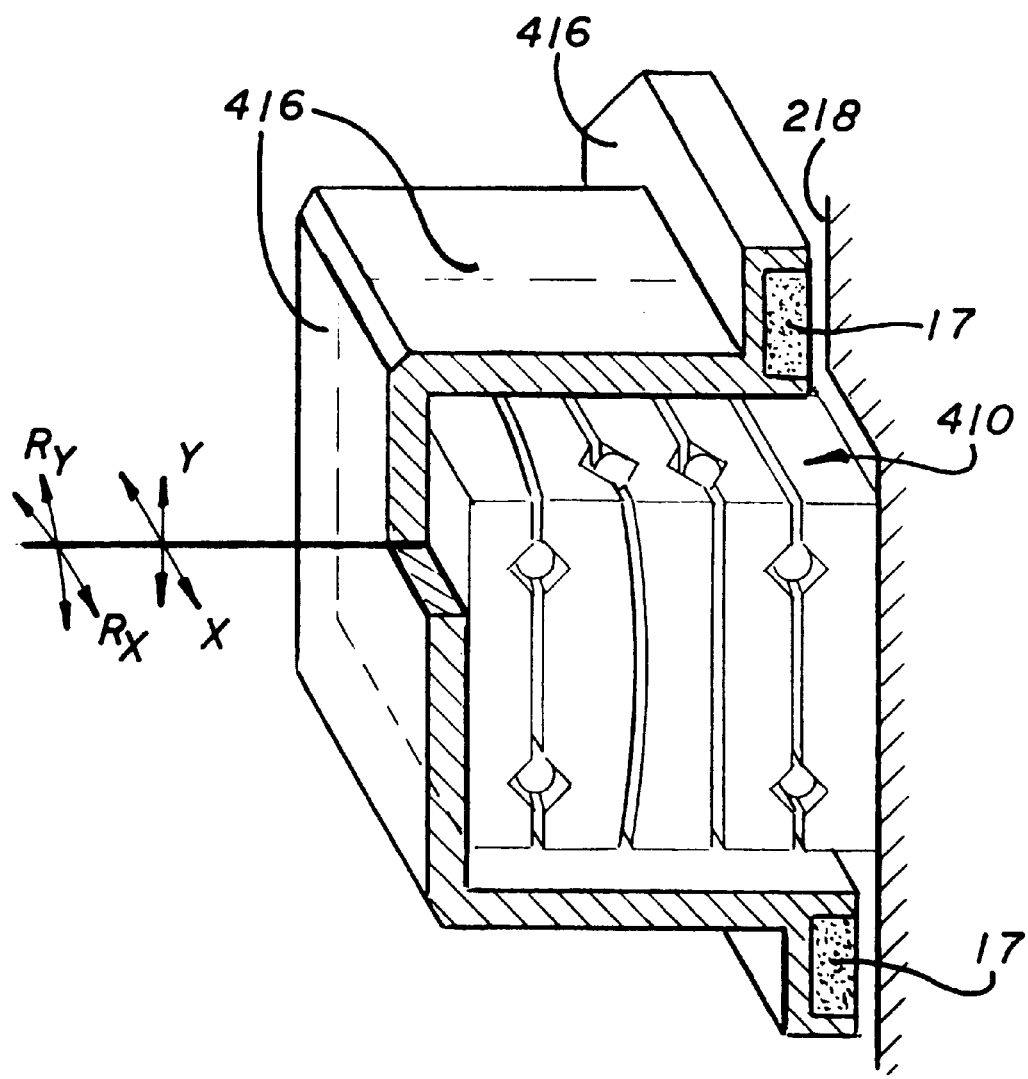
FIG. 18*a* is a somewhat diagrammatic perspective view of a tenth preferred embodiment comprising a wobble-absorbing bearing having an external magnetically stabilized house to impart or augment magnetic attraction.

Such a bearing itself typically has no magnetic features whatever, but acquires key characteristics of my invention when so constrained magnetically. FIG. 18a shows a suitable clamping house 416, but enclosing a bearing assembly 410 of the sort shown in FIGS. 12 through 17.

In interests of both manufacturing simplicity and modularity, however, I prefer to provide such an assembly 410 with parts formed according to my invention, either with or without magnetic features as preferred, and apply the clamping house 416 to compress the several stages together. If the clamping house 416 is used with a WAMB 410 that does have magnetic features, the result can be to augment the magnetic forces already present and thereby, for example, allow an existing WAMB of my invention to handle greater pulling force.

Figure 19:
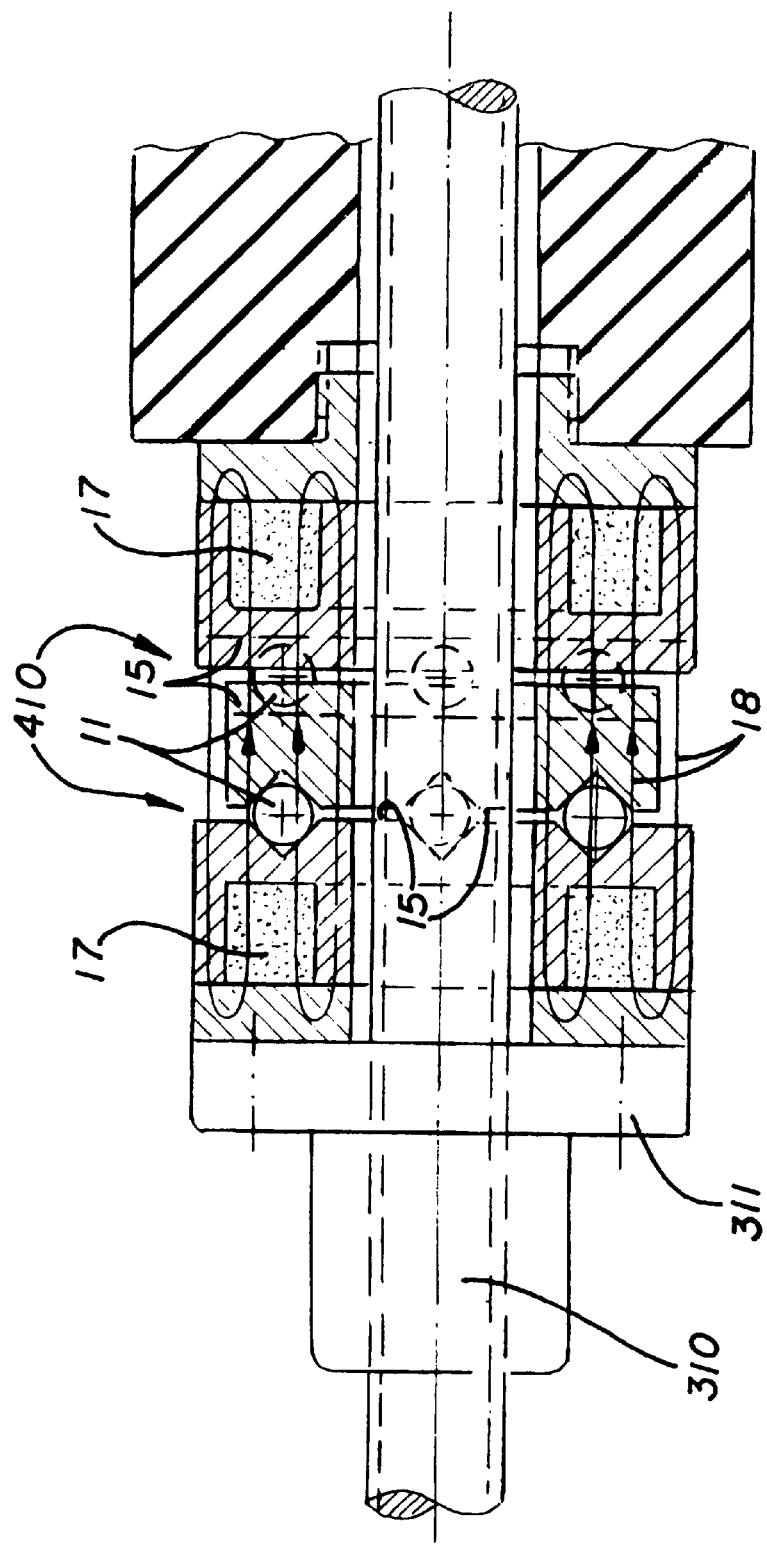
FIG. 19 is an axial section of a simple τ-WAMB related to the planar portions of the FIG. 17 embodiment, but here shown installed in a ballscrew drive.
Figure 20:
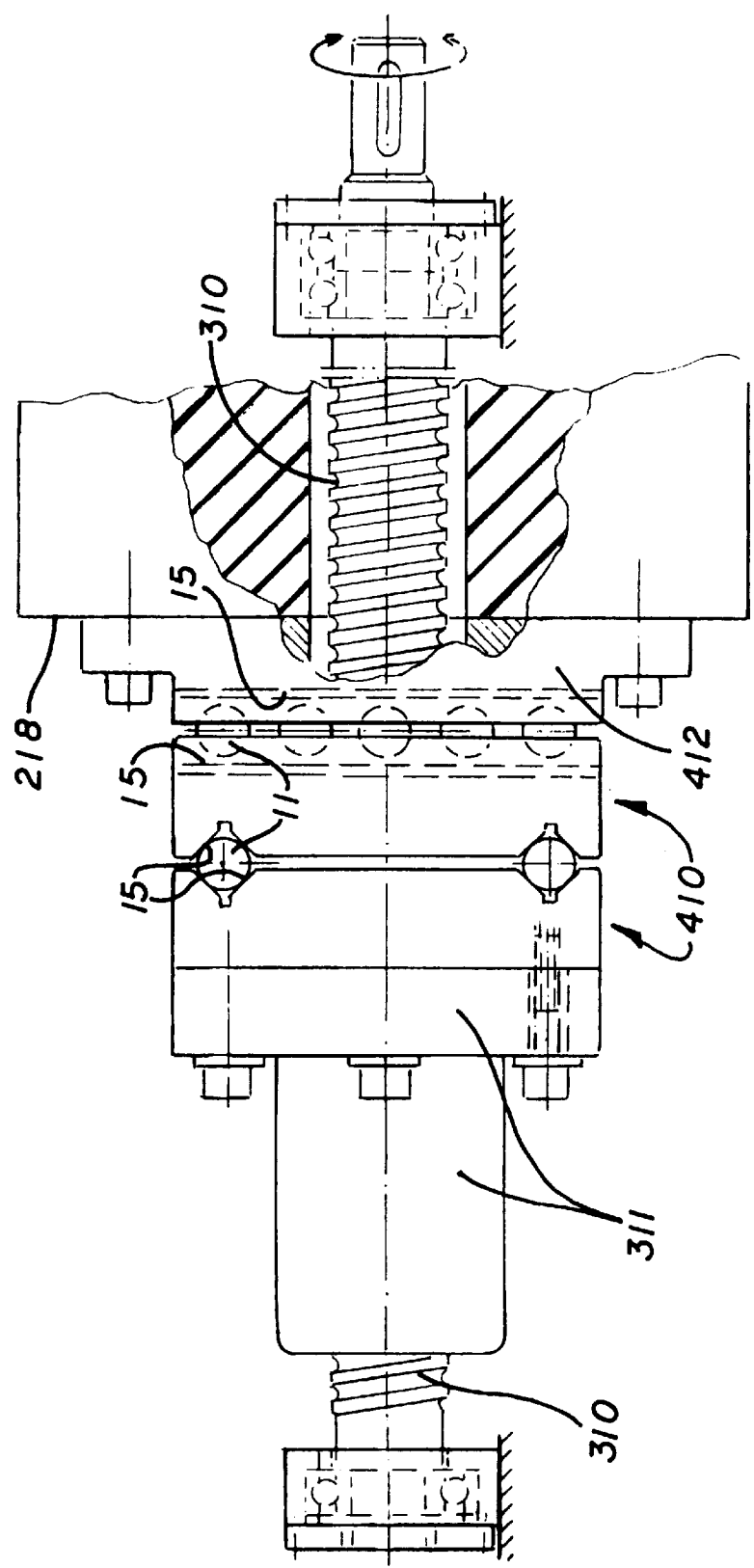
FIG. 20 is an exterior elevation of the FIG. 19 system.

The WAMBs of FIGS. 12 through 17, and 18a, are drawn with square external shape for, primarily, clarity of illustration. Actually all the elements of these drawings can be made cylindrical in overall external shape as desired: this cylindrical geometry is shown in FIGS. 19 and 20, which represent a relatively simple two-stage τ-WAMB that can substitute effectively for the crossed-flanges form covered in the second of my above-mentioned earlier patent documents. The FIG. 19 longitudinal section shows magnets 17 mounted at both ends of the τ-WAMB proper.

Either end of any of these assemblies can be mounted to an extended transverse surface as at right in FIGS. 12 and 13, or to a rod as by a threaded mounting hole 416 in FIG. 13, or built into a nut 311 as in FIG. 19.

9. Lateral-Face Grooves

Figure 21:
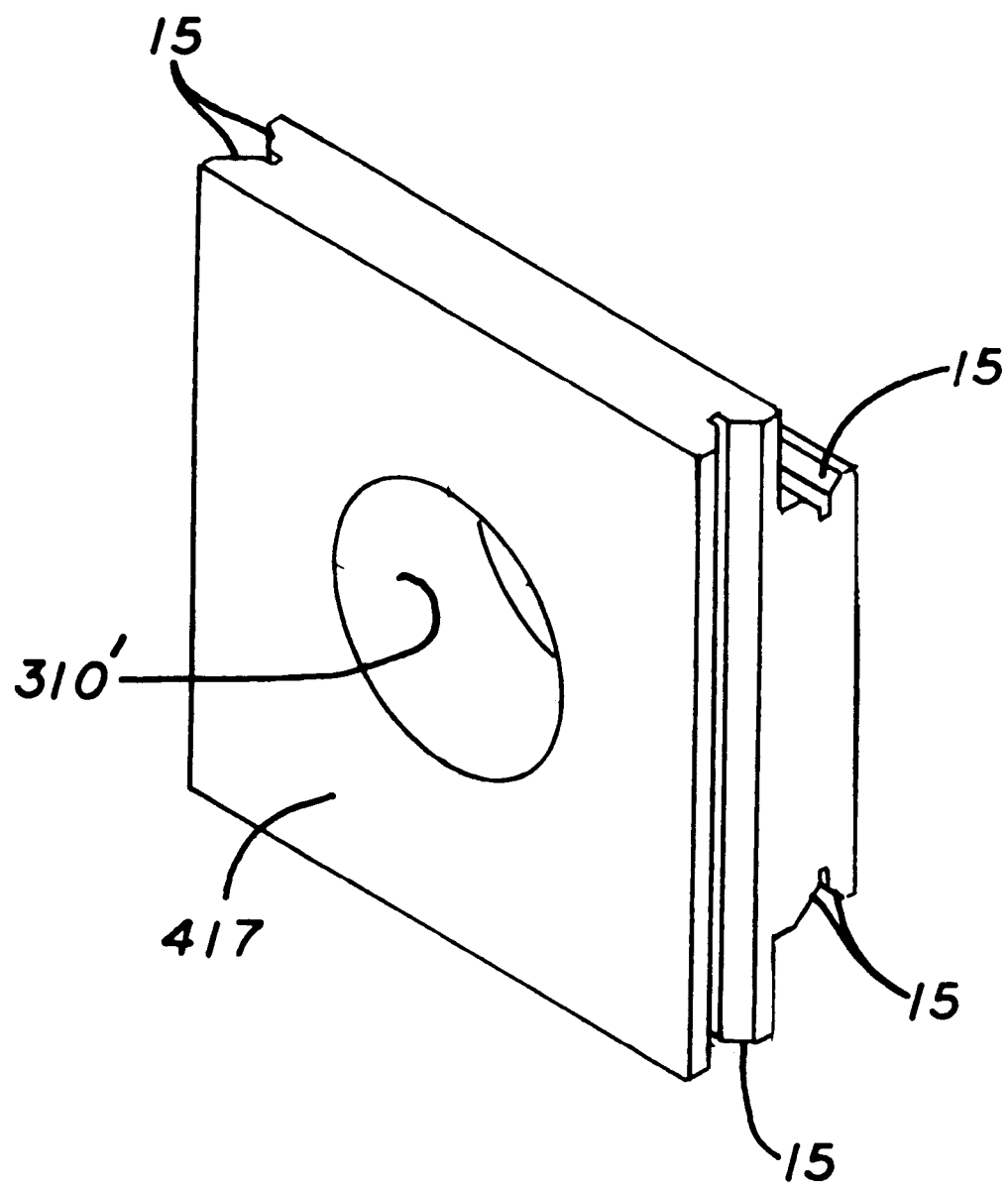
FIG. 21 is a simplified perspective view of an eleventh preferred tongue-and-groove embodiment of a central section for a τ-WAMB using V-grooves in lateral faces rather than opposed faces.

In embodiments that use V-grooves, I prefer to form the grooves in planar-facing opposed surfaces as I have shown. However if preferred they can instead be formed in outward-facing edges, generally as in prior-art drive bearings (FIG. 18). In this case usually no adjustment plates or screws are needed and the adjustment provisions of the prior art can usually be omitted. A resulting module appears in FIG. 21.

10. Torque-Generated and Reflected-Rotation-Generated Spurious Displacements in Ballscrew Drives My earlier patent documents show that a τ-WAMB can be used to restrain a ballscrew nut (or a screw-drive nut, or rotary-to-linear friction drive module) against rotation. This relationship can be used to stabilize the nut against the object—for example, a moving table—that is to be driven by the ballscrew-and-nut combination. Accordingly it is not necessary to use a separate antirotation arm from the nut to a reference rail; also it is not necessary to be concerned about the potential for differences between the two reference surfaces to which a table and an antirotation arm are independently referred.

When the screw is then rotated, relative to the object, the object with attached nut moves longitudinally. In practice the screw is rotated relative to a machine housing or granite table—in the vernacular, "the world"—and the object is stabilized against some housing or table which, it is hoped, is consistent with that screw reference.

Figure 22:
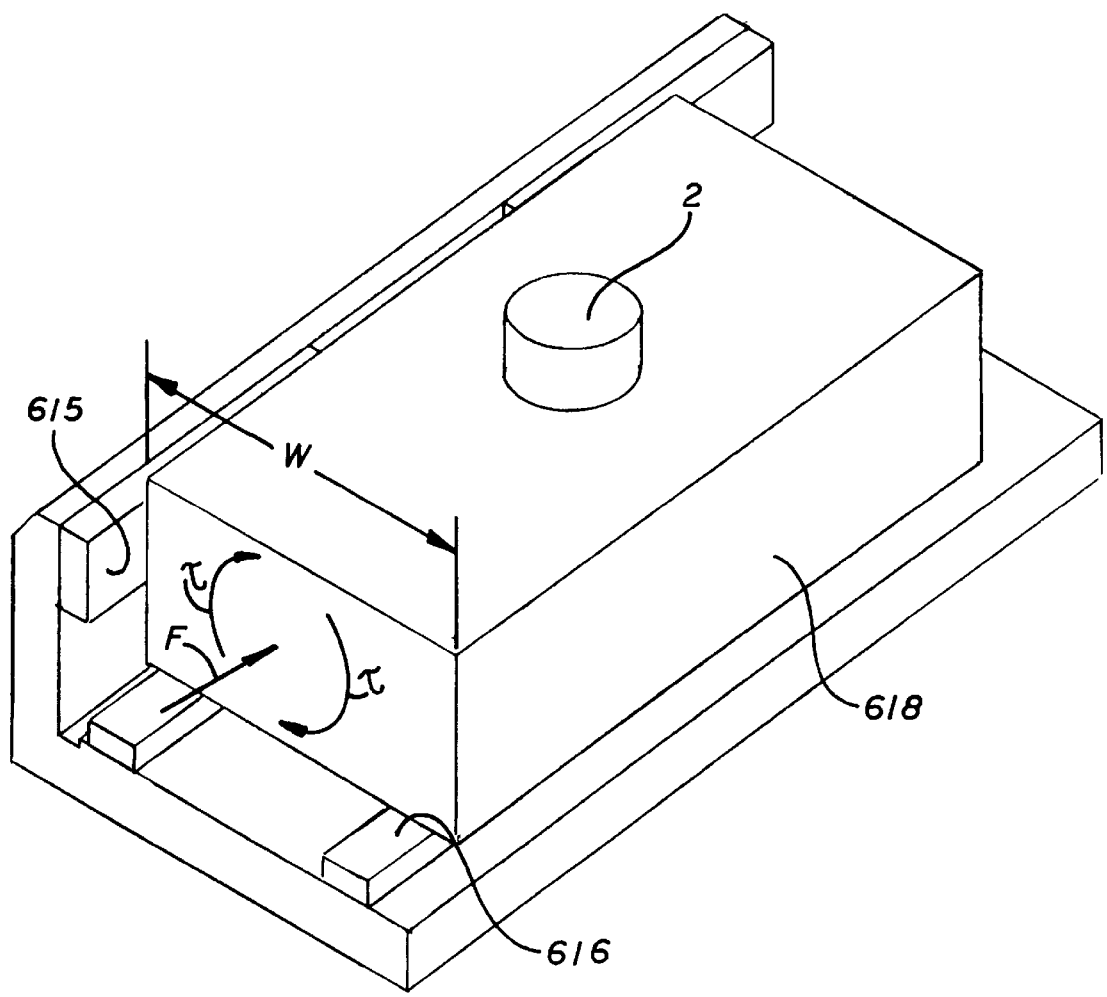
FIG. 22 is a diagrammatic showing of force and undesired-displacement relationships in a system such as that of FIGS. 19 and 20.

If the object is independently and fully stabilized against rotation, this system works well. As a practical matter, however, the concept "fully stabilized" can be difficult to realize in practice. FIG. 22 represents a table 618 that is being driven along a table 616 and guideway 615 by force F from such a drive screw (not shown in FIG. 22), with the torque τ of the screw against the nut being taken up—as above described—through a τ-WAMB so that the nut is stabilized against the table 618.

The torque τ also acts against the left front corner of the table (see τ-labeled upward-curved arrow at that point in the drawing), tending to lift that corner of the table in rotation about the right front corner. It will be understood that the amount of torque τ is exceedingly small, and the table 618 is taken to be very heavy—the force g acts downward from the center of the table as shown, and may be augmented magnetically by attraction between the table 618 and the track 616 as also indicated in the illustration—so that in simple principle the torque τ cannot lift the corner of the table.

On the other hand, apparatus 2 operating on the table 618 may be a sensitive optical measuring device, or an optically-positioned apparatus (e.g., an integrated-chip fabricating machine). In such a case, deflections z (FIG. 22) of a fraction of an optical wavelength may be very important to proper operation.

Figure 22A:
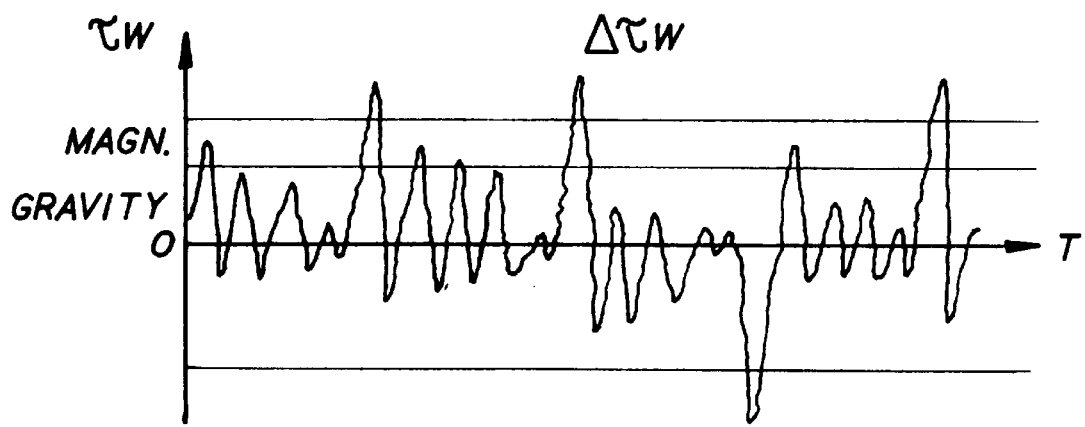
FIG. 22*a* is a graph showing derivation of net displacing force vs. time in the FIG. 22 system.

FIG. 22a shows how small and nearly unnoticed deflections z can arise from time to time—as the applied force τw resulting from projection of the applied torque τ (FIG. 22) through the lever arm of the table width w momentarily exceeds the sum of the downward magnetic and gravitational forces. The excess Δτw naturally raises the table by an nearly but not really infinitesimal fluctuating distance z—which is typically very undesirable.

Figure 23:
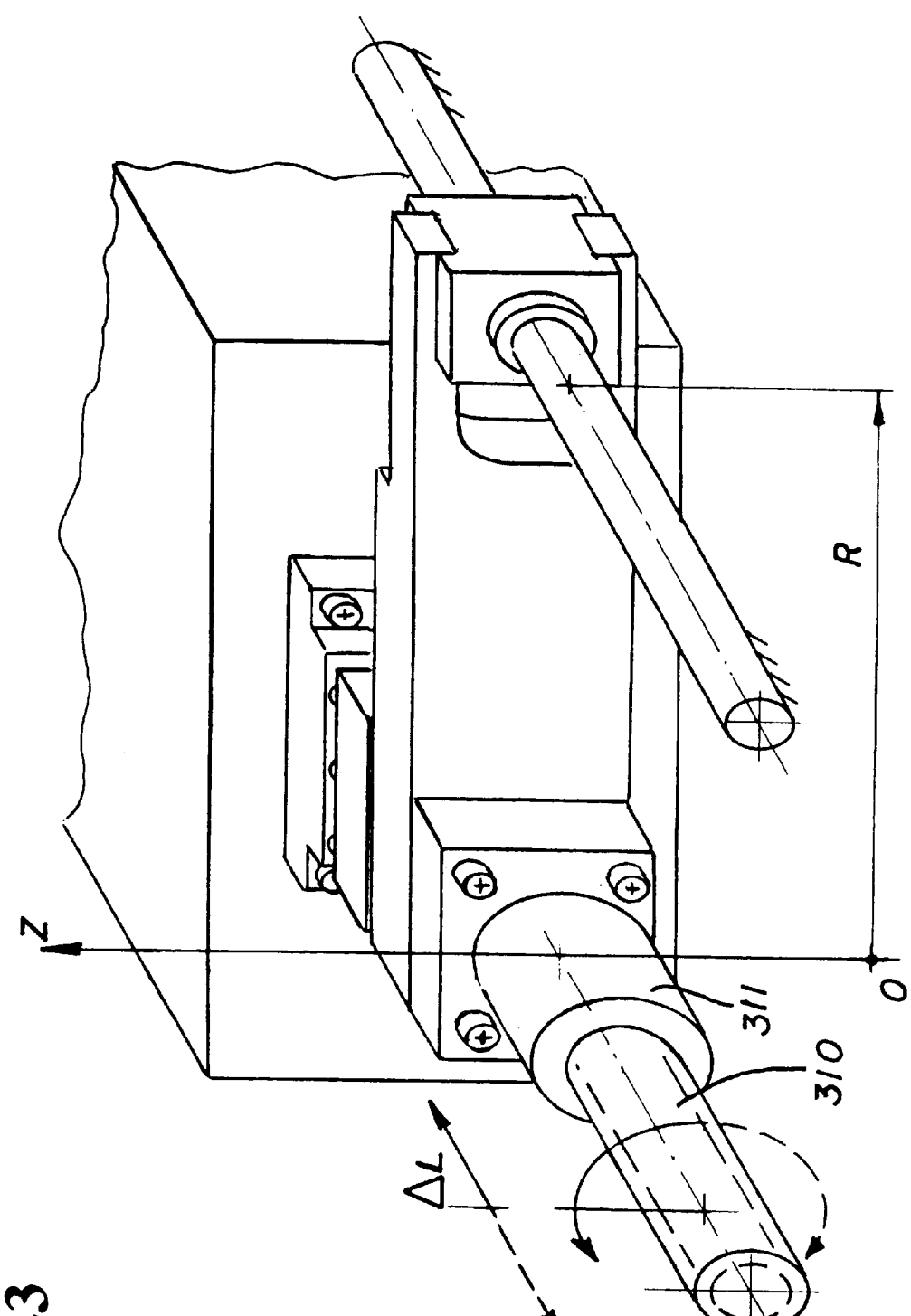
FIG. 23 is a diagrammatic showing of spurious displacement relationships in two orthogonal directions, in a more-conventional ballscrew drive.

In conventional antirotation-arm systems a similar effect can occur, but in addition another adverse effect can enter: transformation of a small fluctuation z in vertical position into a fluctuation in longitudinal position ΔL. This is shown in FIG. 23, where it is assumed first that the torque of the screw 310 against the nut 311 causes—in a manner analogous to that described above for the τ-WAMB system—the nut to move up and down slightly. Even if it does not do so, wobble in the drive screw itself is likely to raise and lower the nut slightly.

Now assuming also that the antirotation arm is well stabilized against its rail, the vertical motion z of the nut 311, acting through the distance R between the reference rail and the drive axis, introduces a fluctuating rotation of the nut 311 relative to the screw 310. Such rotation, acting through the rotary-to-linear conversion function of the nut-and-screw combination, induces a correspondent fluctuating linear position of the nut and table.

Conventionally the positioning accuracy of a high-precision moving table—due to deficiencies in the drive systems of the prior art—may not be seriously degraded by effects such as just described. Conventional drive systems may not typically be precise enough to enable detection of such small fluctuations.

Using my WAM and τ-WAM devices, however, drive precision may be made clean enough that new, higher levels of precision come into view and become very desirable. As a result, vertical motions and even the small resulting longitudinal fluctuations described above can become troublesome.

11. Torque Isolation

I have addressed this problem and developed a solution to it. The solution resides in attachment of a torque-isolation module 501 (FIGS. 24 through 27). This module taps into the drive train at a point essentially between the nut 311 with its attached τ-WAMB 410' on one hand, and the table 218 on the other hand.

The torque-isolation module in effect shunts nearly all the residual torque off to a base ("the world"), leaving in the system at the table 218 an almost-pure linear driving motion. An additional torque-nontransmitting WAMB 410" helps ensure that the desired fluctuations in position and angle of the torque-isolation module 501 are not transmitted to the table 218.

Figure 24:
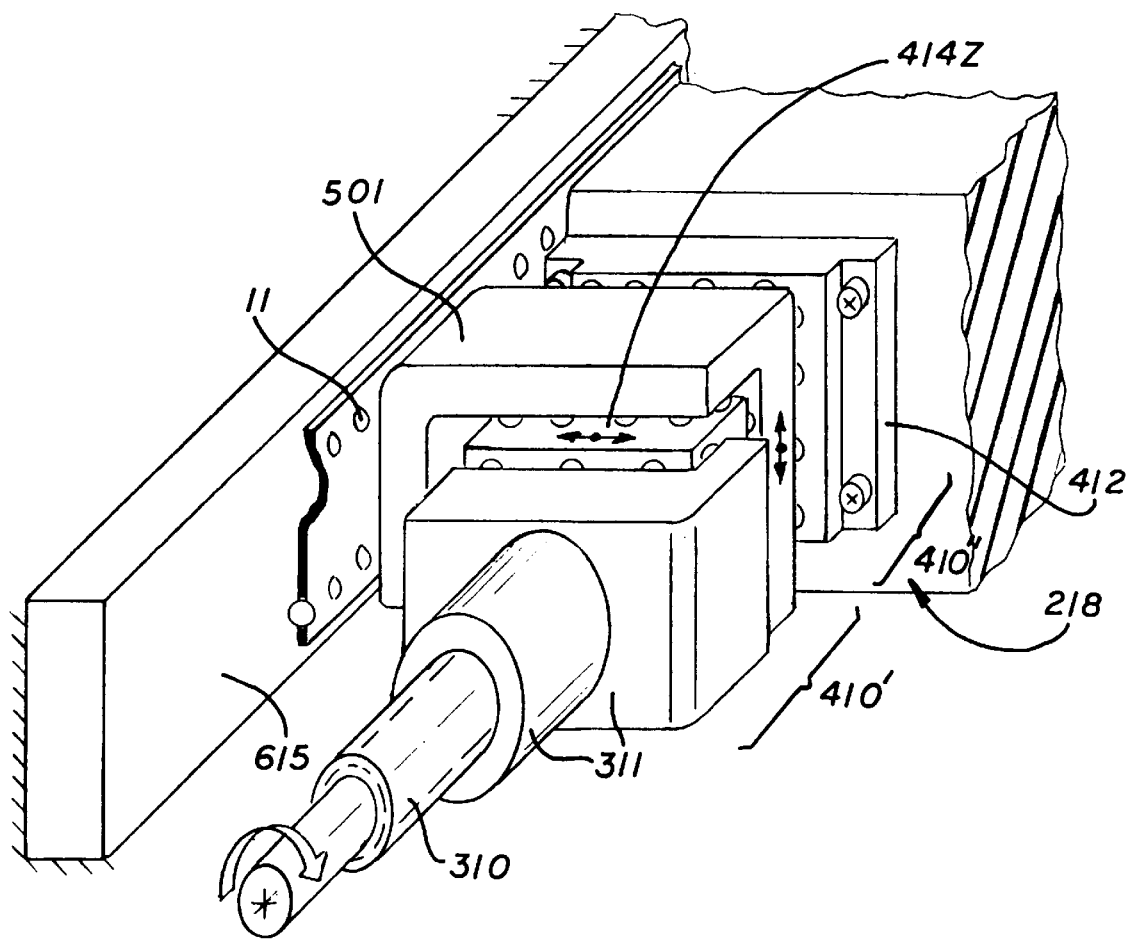
FIG. 24 is a perspective view of a twelfth preferred embodiment of my invention, having a torque-isolation stage for interfering with the FIGS. 22 and 23 relationships to substantially eliminate the undesired or spurious displacements.
Figure 25:
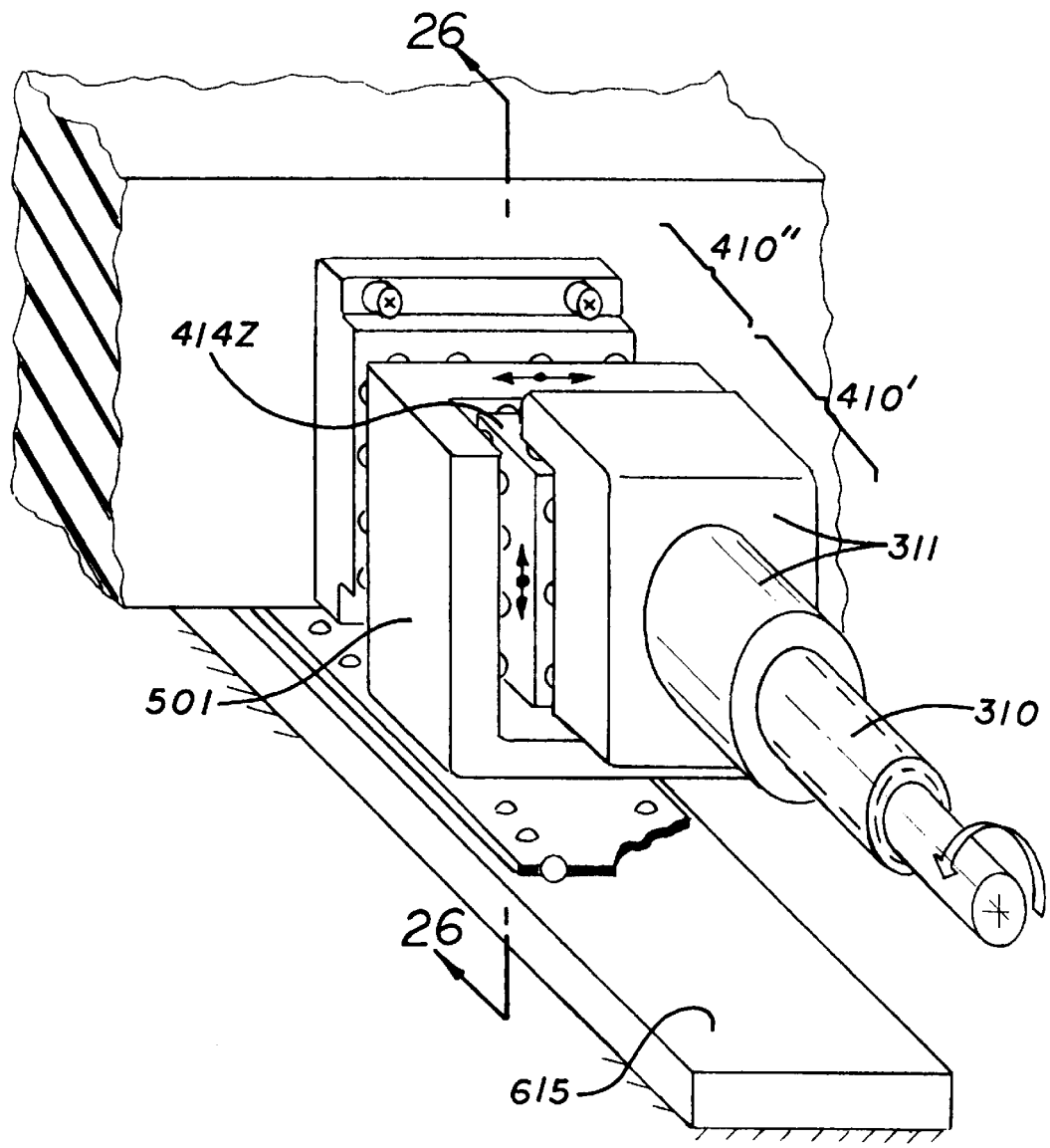
FIG. 25 is a like view of the FIG. 24 device in another operating orientation.

FIG. 25 shows that the system with torque-isolation stage can operate in other orientations, and in fact I believe that like other embodiments of my invention it can operate in virtually any needed orientation—including arrangement with the shaft 310 vertical. My primary present concern, however, is with the FIG. 24 orientation as this is particularly aimed at correcting the vertical motion discussed in connection with FIGS. 22, 22*a* and 23.

Figure 26:
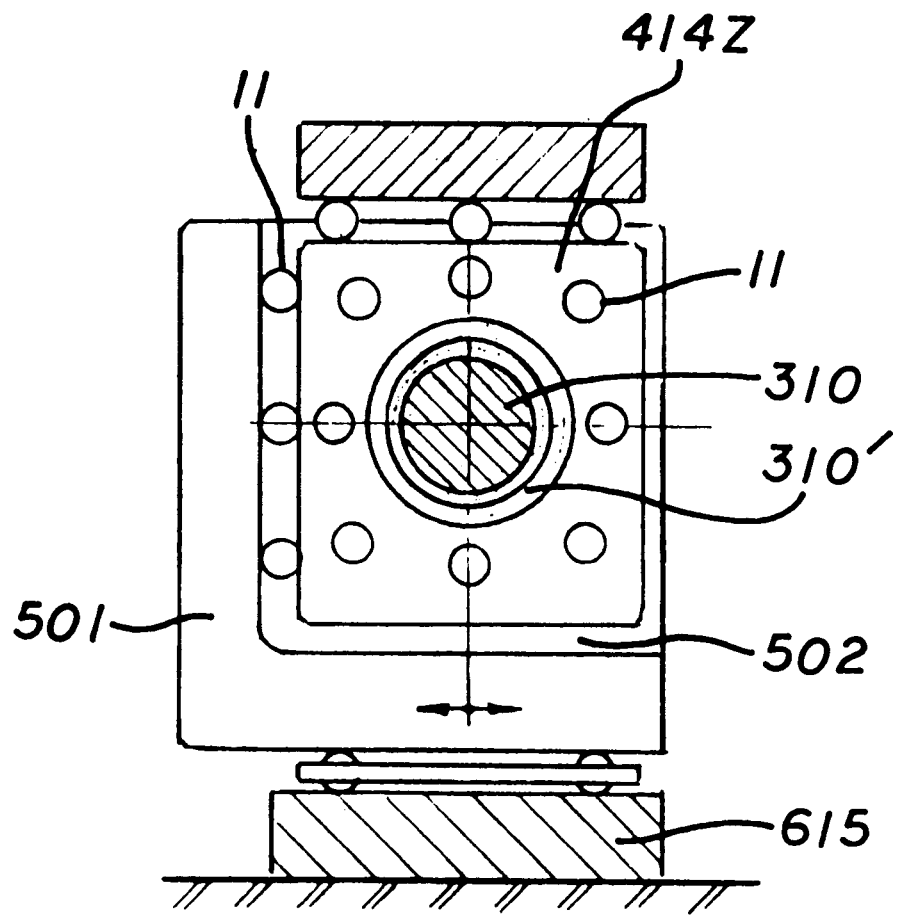
FIG. 26 is a cross-sectional elevation of portions of the FIGS. 24 and 25 torque-isolation stage, taken along the line 26—26 in FIG. 24.
Figure 27:
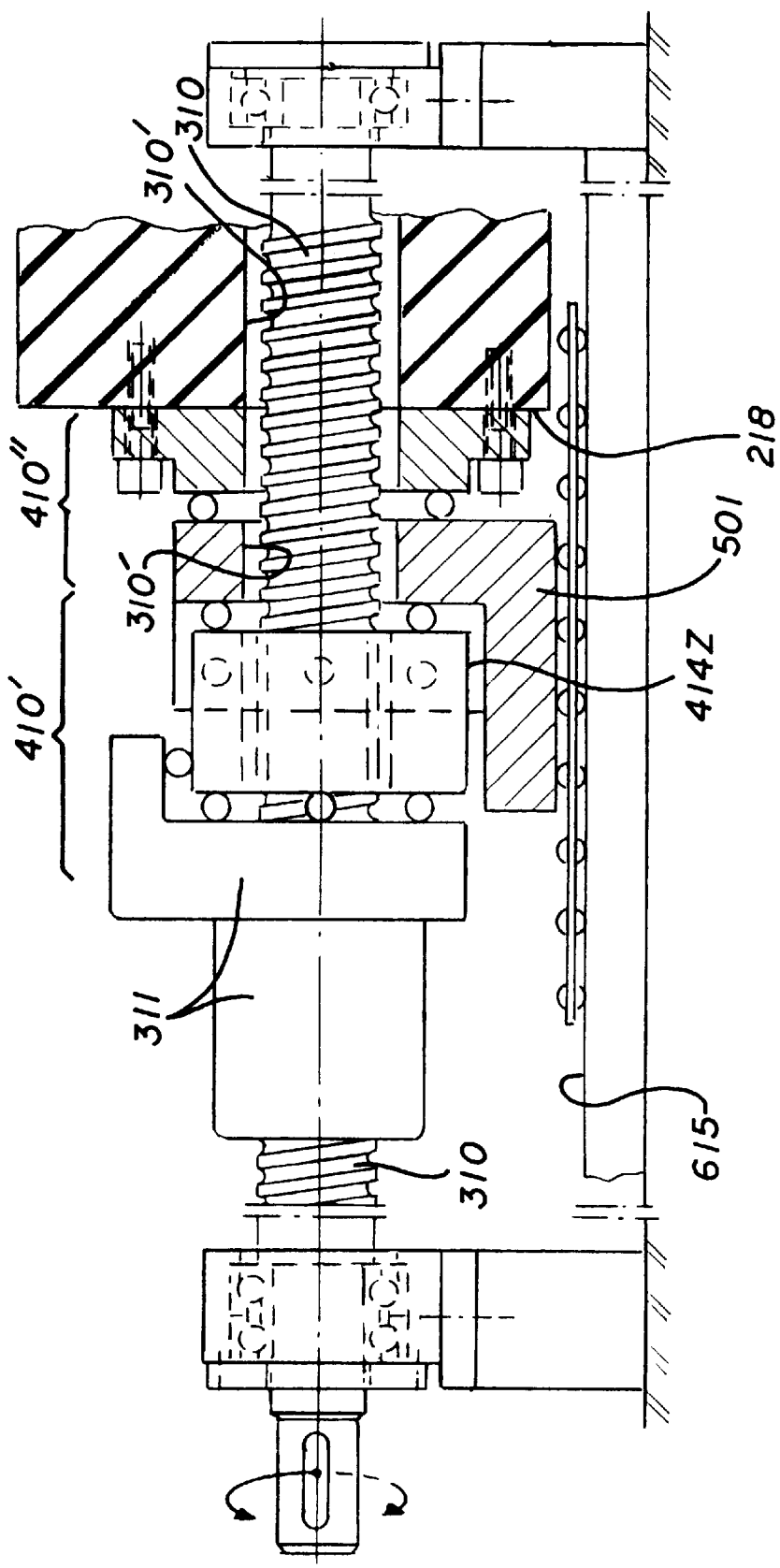
FIG. 27 is a longitudinal-section, in plan, of the FIG. 24 through FIG. 26 system.

FIGS. 26 and 27 show that the isolation stage 510 simply accepts vertical force. (More specifically, I here refer to force directed parallel to the guidewall 615 which is vertical in FIG. 24, as that is the force that would accordingly tend to raise the table 218.)

The isolation stage 501 is free to move parallel to the vertical guidewall 615, but is held magnetically against that guidewall—magnetically clamping a set of balls 11 between the stage 501 and wall 615. Therefore no significant vertical force can be transmitted between the nut 311 or isolation stage 501 and the table 218.

On both sides of the isolation stage 501, as shown in FIG. 27 the isolation stage is direct-coupled longitudinally through a τ-WAMB to the nut 311 and through a WAMB to the table 218. In other words the nut 311 and table 218 are longitudinally coupled together, through the τ-WAMB 410' and the WAMB 410" in series.

Since both the WAMB and τ-WAMB transmit linear force directly, the distance between the nut 311 and table 218 is fixed. This implies that the precision motion of the nut 311 is transmitted directly to the table 218.

While torque at the nut 311 cannot be transmitted to the table 218 because almost all the torque is shunted through the isolation stage 501 to the guidewall 615, it is true that the nut 311 may be rising and falling with any wobble in the screw 310. In the antirotation-arm system, as will be recalled, such motion was transformed through the nut-screw conversion function into longitudinal wobble.

In FIG. 24, however, the effective lever arm between the screw 310 axis and the guidewall 615 can be made quite small—compared with the longer arm distance R of the antirotation element in FIG. 23. In fact the antirotation element depends on its length for effectiveness in its function of stabilizing the nut against rotation.

The isolation stage 501 and entire ballscrew unit 310–311 of my system would in no way benefit from spacing away relative to the guidewall 615: they can be placed as close to it as desired. Such placement minimizes effective rotation of the nut 311 due to wobble in the screw 310, thereby essentially eliminating any imparting of vertical motion to the table 218.

12. Compound External-Magnet Configurations

As mentioned earlier in connection with FIGS. 18 and 18*a*, magnetic clamping force can be applied from magnets other than those which form a wobble-absorbing magnetic bearing—either so as to augment magnetic clamping produced by a wobble-absorbing magnetic bearing, or so as to clamp together a potentially wobble-absorbing bearing that has no magnetic features. Several such arrangements appear in FIGS. 28 through 33.

Figure 28:
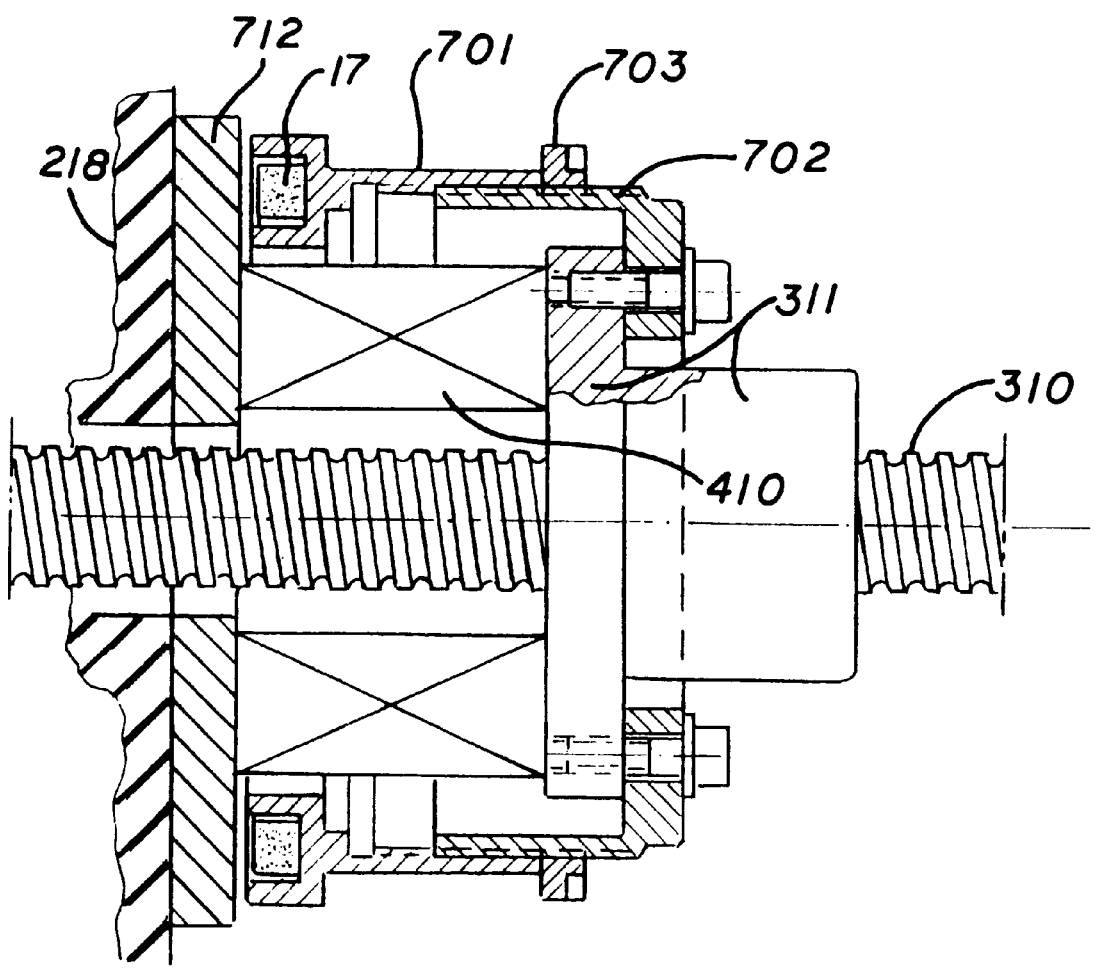
FIG. 28 is a schematic longitudinal section of a twelfth embodiment of my invention, having magnetic-force imparting or augmenting means for a wobble-absorbing bearing in a ballscrew drive, in which the magnetic means are placed radially outward of the bearing.

In FIG. 28 just the upper radial half of the system is shown. The system contains a WAMB 410, symbolized generically by a rectangle filled with a large "X".

The additional magnetic equipment 17, 701–703 in this system is not only quite separate from the magnetic elements of the wobble-absorbing magnetic bearing 410 but also radially outward from the WAMB, and so is external to the WAMB in two senses of the word "external".

A magnet 17 is supported from the nut 311 by a cup 701–702 which has two segments screwed together longitudinally so that the depth of the cup is adjustable. Along the open rim of the cup is an annular magnet or series of magnets 17.

The cup depth is adjusted to closely space the magnet or magnets 17 adjacent to an end plate 712 which is at the table side of the WAMB 410. The end plate 712 in fact forms a connection surface for the table 218.

When the adjustment is satisfactory, the cup length is frozen by advancing the locknut 703 to jam the forward segment of the cup. The magnet 17 pulls the main nut 311 toward the end plate 712 to provide the added or primary external clamping force as desired.

Figure 29:
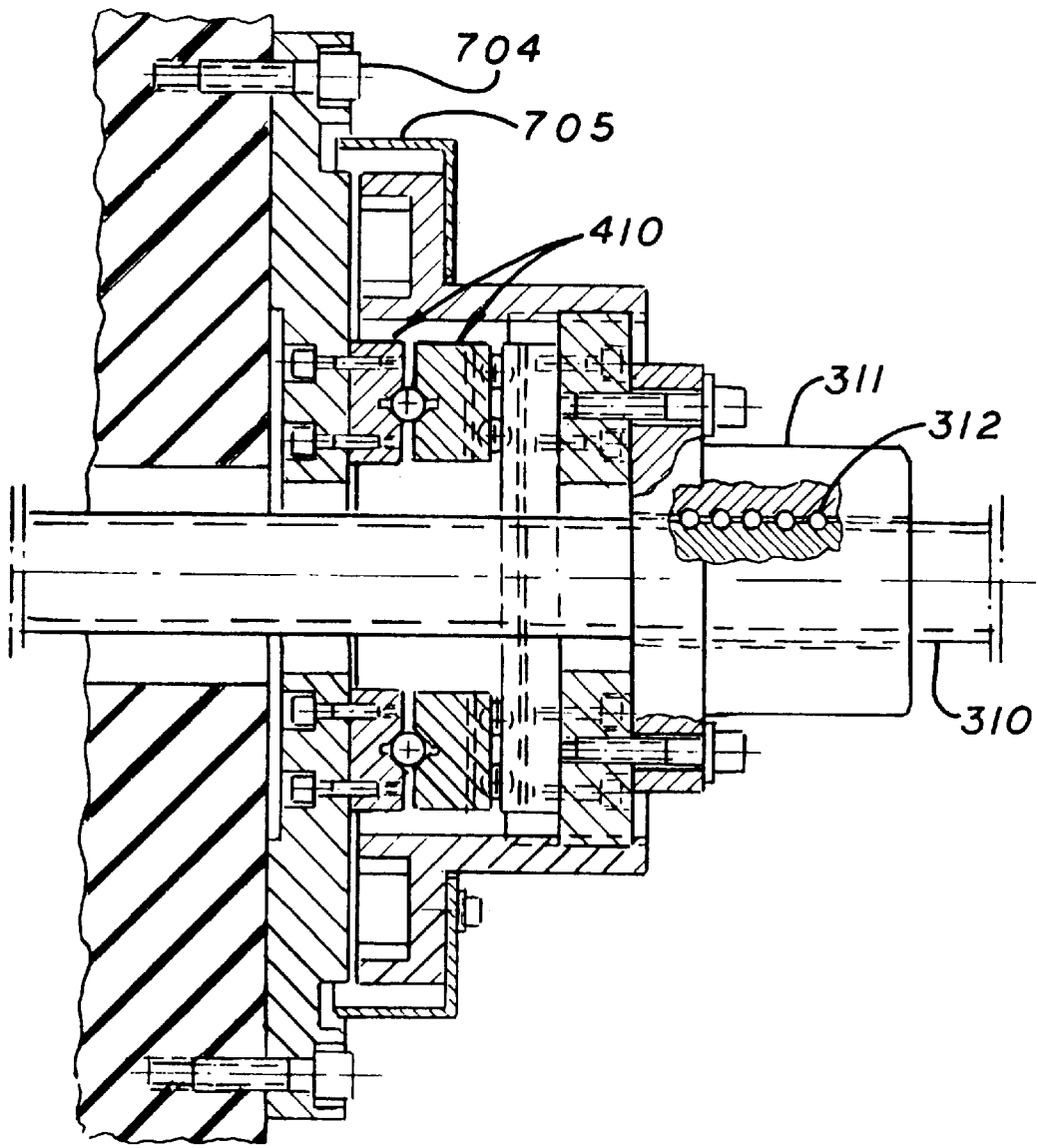
FIG. 29 is a like view, but less somewhat schematic, of the FIG. 28 system.

FIG. 29 is similar but shows added detail of a circumferential shielding groove 704, formed in the end plate 218 to receive an auxiliary flux-shielding cup 705—and also some detail of a representative WAMB.

Figure 30:
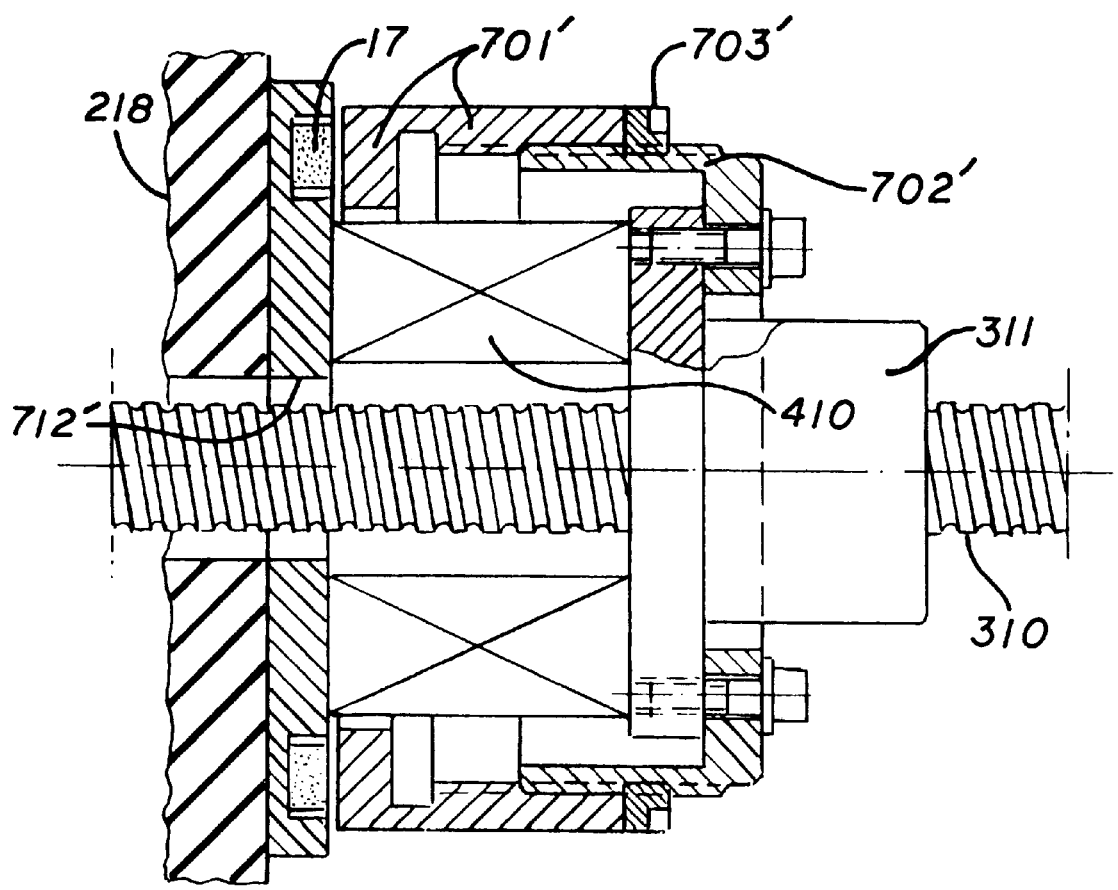
FIG. 30 is a like view of a variant of the FIG. 28 system.

FIG. 30 is similar to FIGS. 28 and 29 but shows that the magnet 17 can be mounted to the end plate 712' instead of the adjustable cup 701', 702'. Here the cup simply terminates in a steel plate for adjustment relative to the magnet 17; essentially the same force relations result from cup adjustment as in FIGS. 28 and 29.

Figure 31:
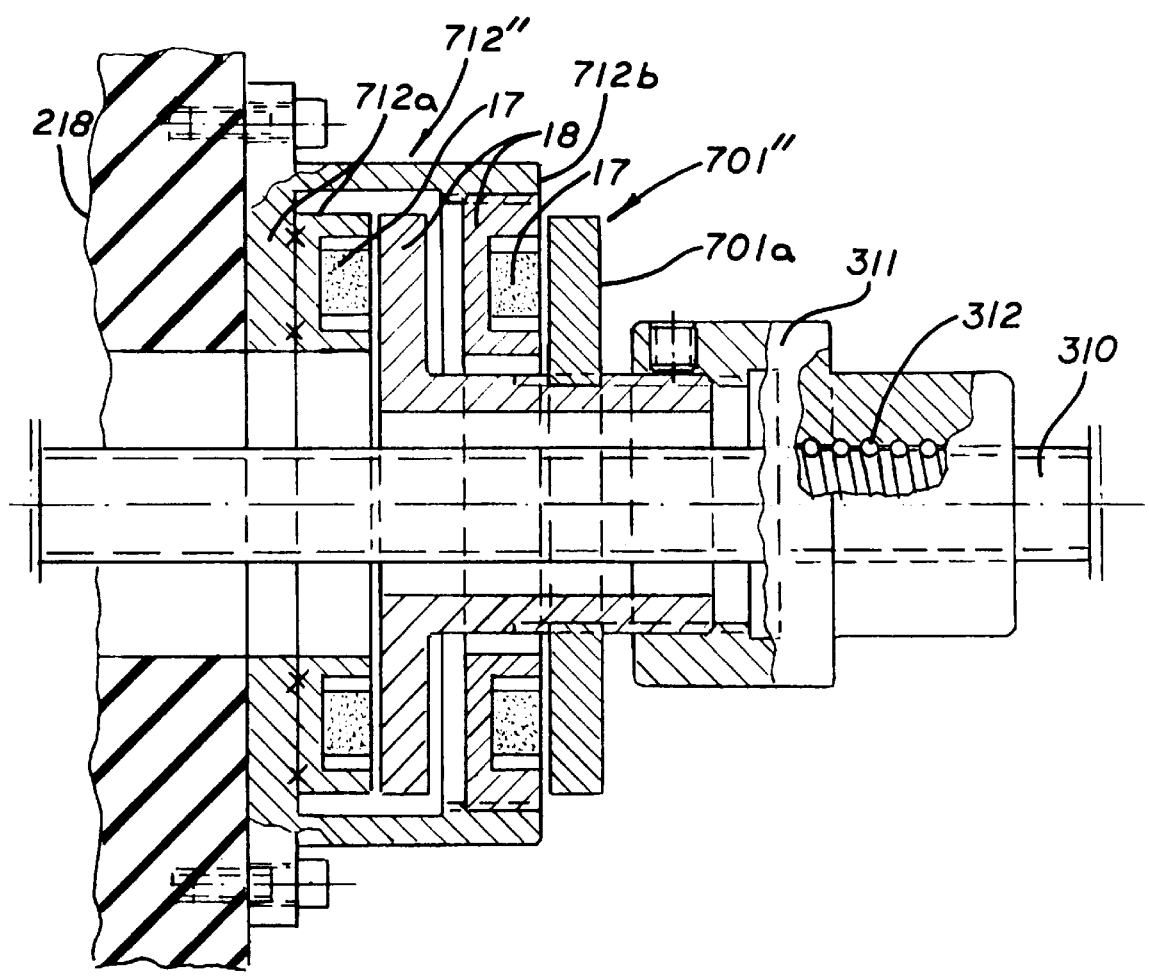
FIG. 31 is a like view of a thirteenth preferred embodiment of my invention, in which magnetic-force imparting or augmenting means have multiple layers.

FIG. 31 shows one way to create additional surface and volume for aggregating magnetic force. Outward-directed radial vanes 701a, 701b are formed on a longitudinal extension 701" of the ballscrew nut 311; and inward-directed radial vanes 712a, 712b are formed on a longitudinal extension 712" of the end plate.

The inward-directed end-plate vanes 712a, 712b are interleaved with the outward-directed nut vanes 701a, 701b. Magnets are mounted to either or both sets of vanes (here to the nut vanes), and the interleaf spacing is adjusted by screwing one set of vanes (here the ball-vane extension 701") longitudinally toward or away from the other.

Figure 32:
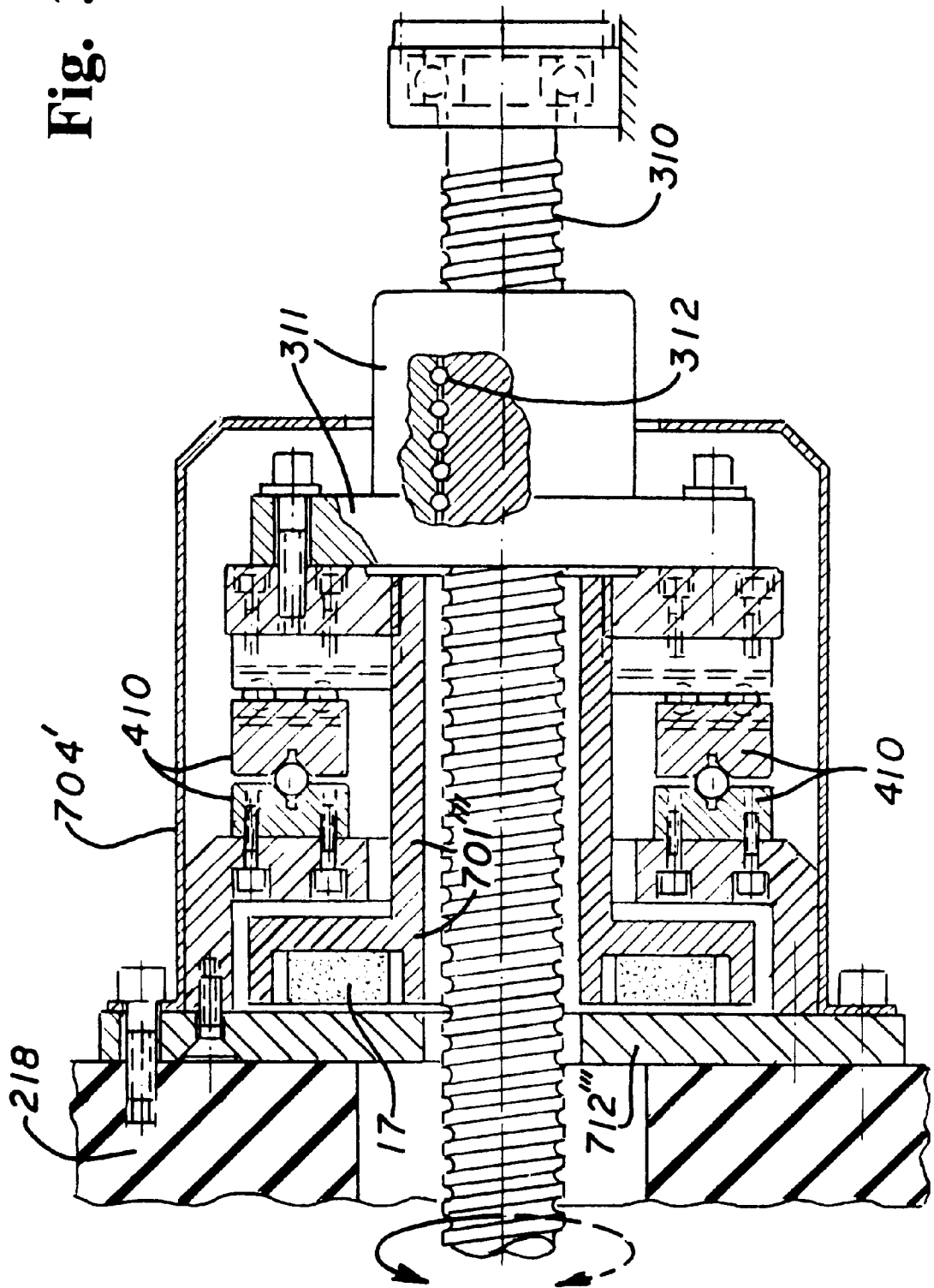
FIG. 32 is a like view of a fourteenth preferred embodiment in which magnetic-force imparting or augmenting means are placed radially inward of the bearing.
Figure 33:
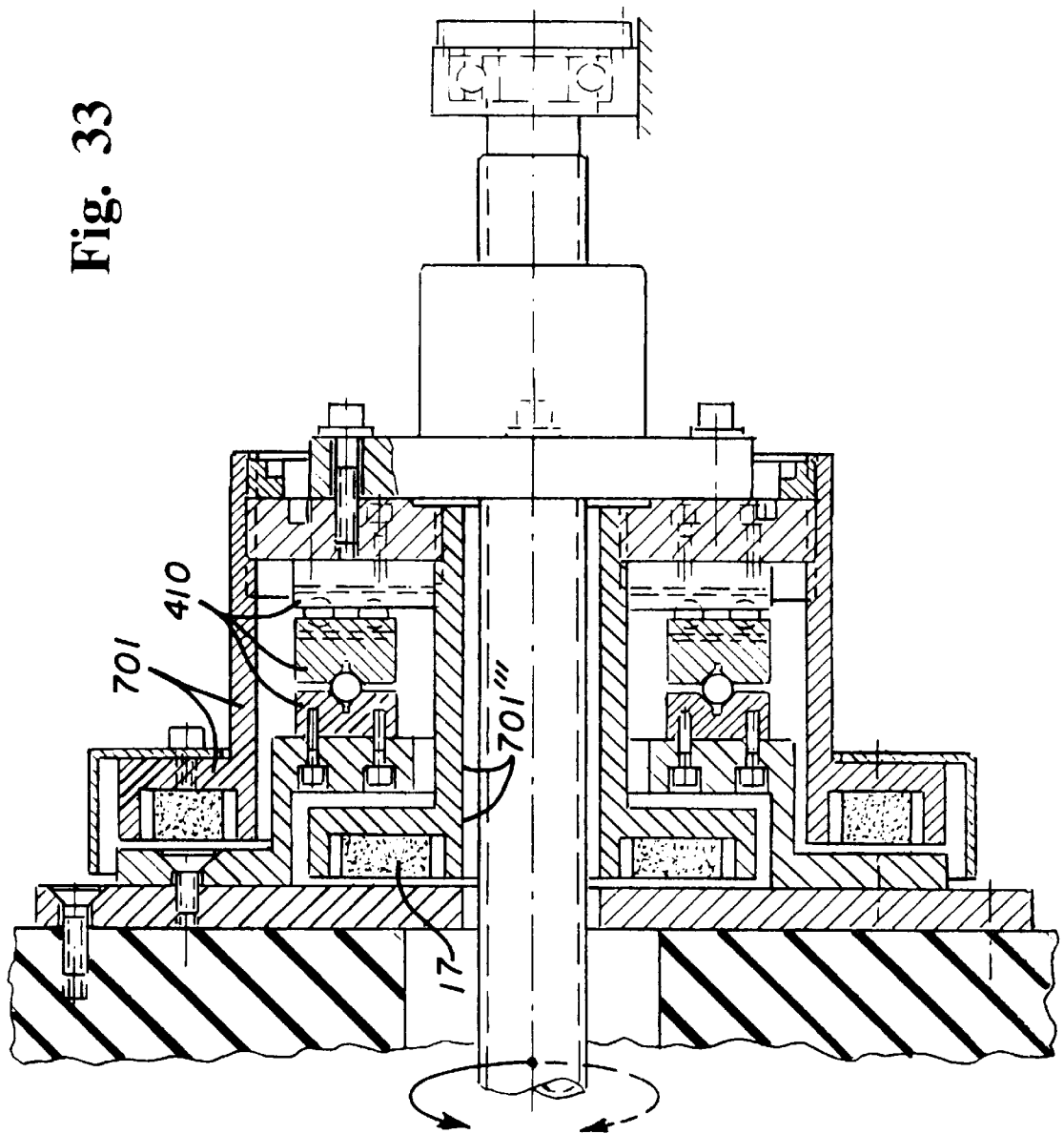
FIG. 33 is a like view of a sixteenth preferred embodiment in which magnetic-force imparting means are placed radially both inward and outward of the bearing.

FIG. 32 shows that magnetic force can be added by extending and holding extra magnet area and volume 17 radially inside rather than outside the WAMB 410; as in FIG. 28 the magnets are longitudinally adjusted relative to the end plate 712'''. FIG. 33 demonstrates that it is possible to provide magnet-carrying adjustable extensions 701 and 701''' both radially inside and radially outside the WAMB region.

Figure 34:
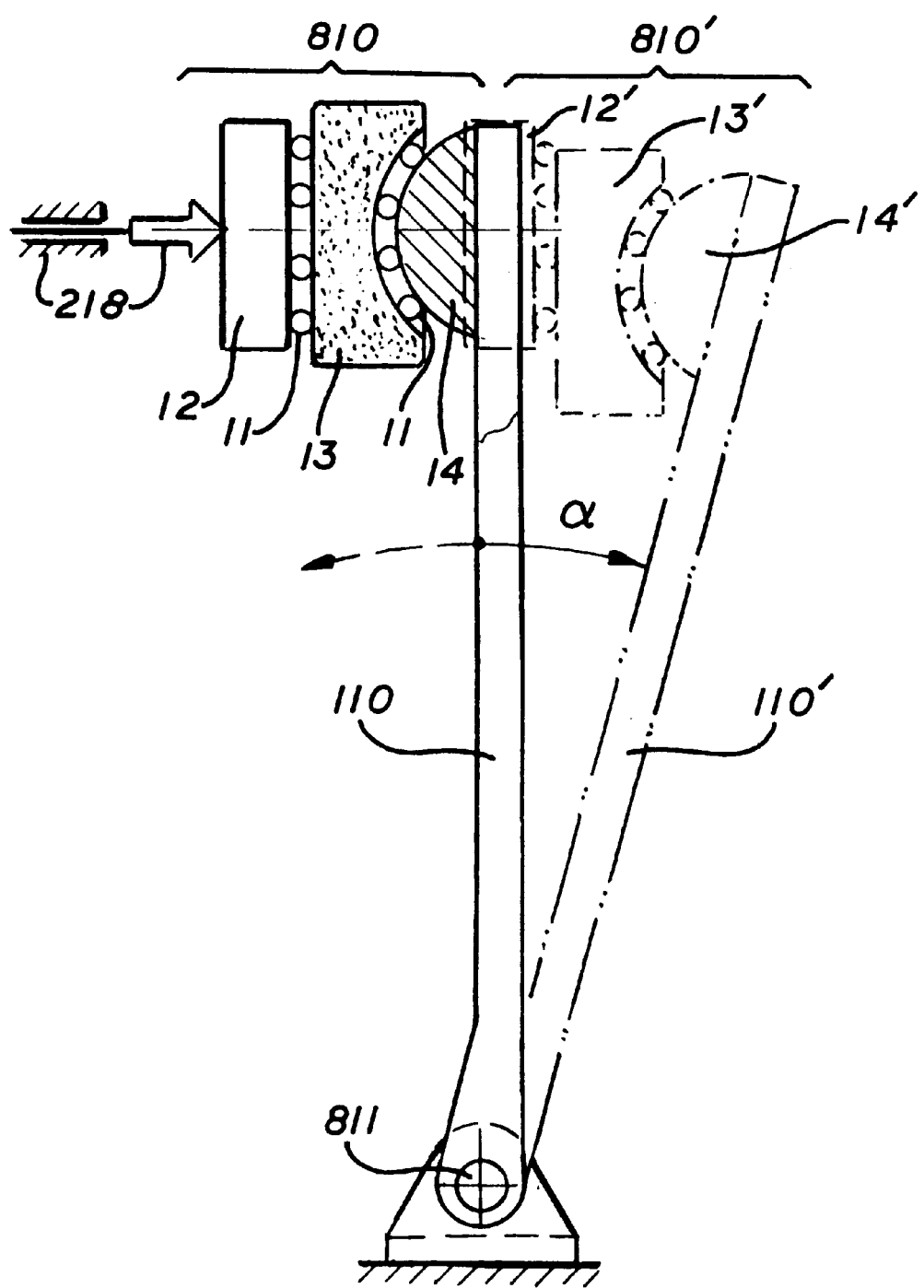
FIG. 34 is a schematic showing of a seventeenth preferred embodiment of my invention in a rotary arm drive.

13. Wobble-Absorbing Magnetic Bearings in Rotary-Arm Drives and Antirotation Arms Whereas the discussion heretofore has focused upon using WAMBs within in-line drive environments, FIG. 34 shows that a WAMB 810 can be used in a rotary-arm type of drive. Here rotary motion of a shaft 811 is coupled by an arm 110—which pivots with the shaft—through the WAMB 810 to a table or other object 218 that is movable linearly. The same WAMB 810, arm 110 and geometry can be used for coupling of linear drive motion from 218 to operate the shaft 811.

In either case an essentially sinusoidal relation obtains between the table 218 translation and shaft 811 rotation. As the drawing shows, the WAMB accommodates rotation of the arm clockwise to a new position 110' through downward shifting of the central element to a new lower position 13', and both translation and rotation of the rightmost element 14 with the shaft to a new angular position 14'.

Angular travel $\alpha$ is limited by the permissible ball travel along the surface pairs 12–13 and 13–14, but—as suggested in the drawing by the double-headed arrow $\alpha$—can also extend to negative values (counterclockwise rotation), with upward shifting of the central element 13.

Figure 35:
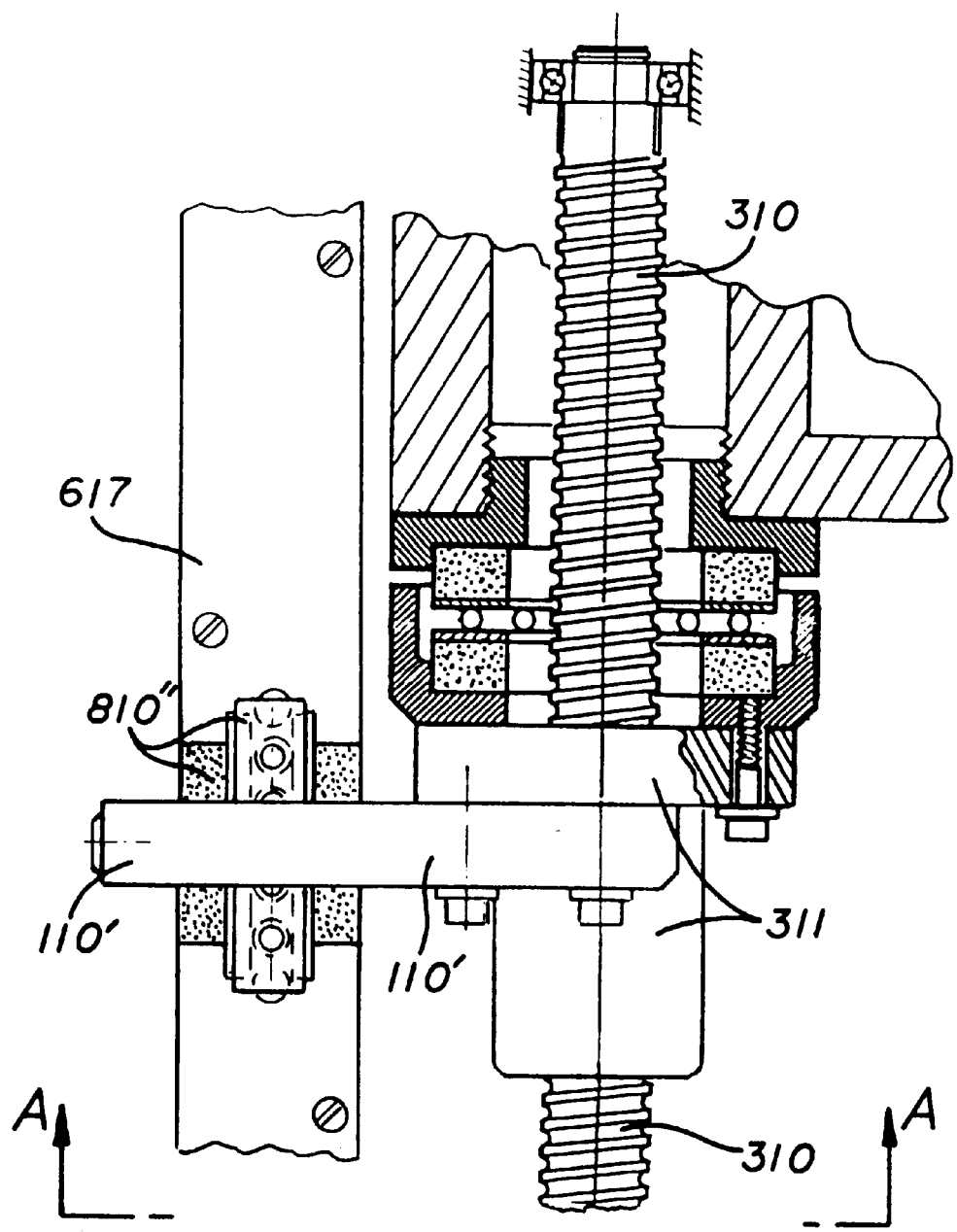
FIG. 35 is a plan view, partly in longitudinal section, of a ballscrew drive modified in accordance with an eighteenth preferred embodiment of my invention that is a special form of the FIG. 34 embodiment.
Figure 35A:
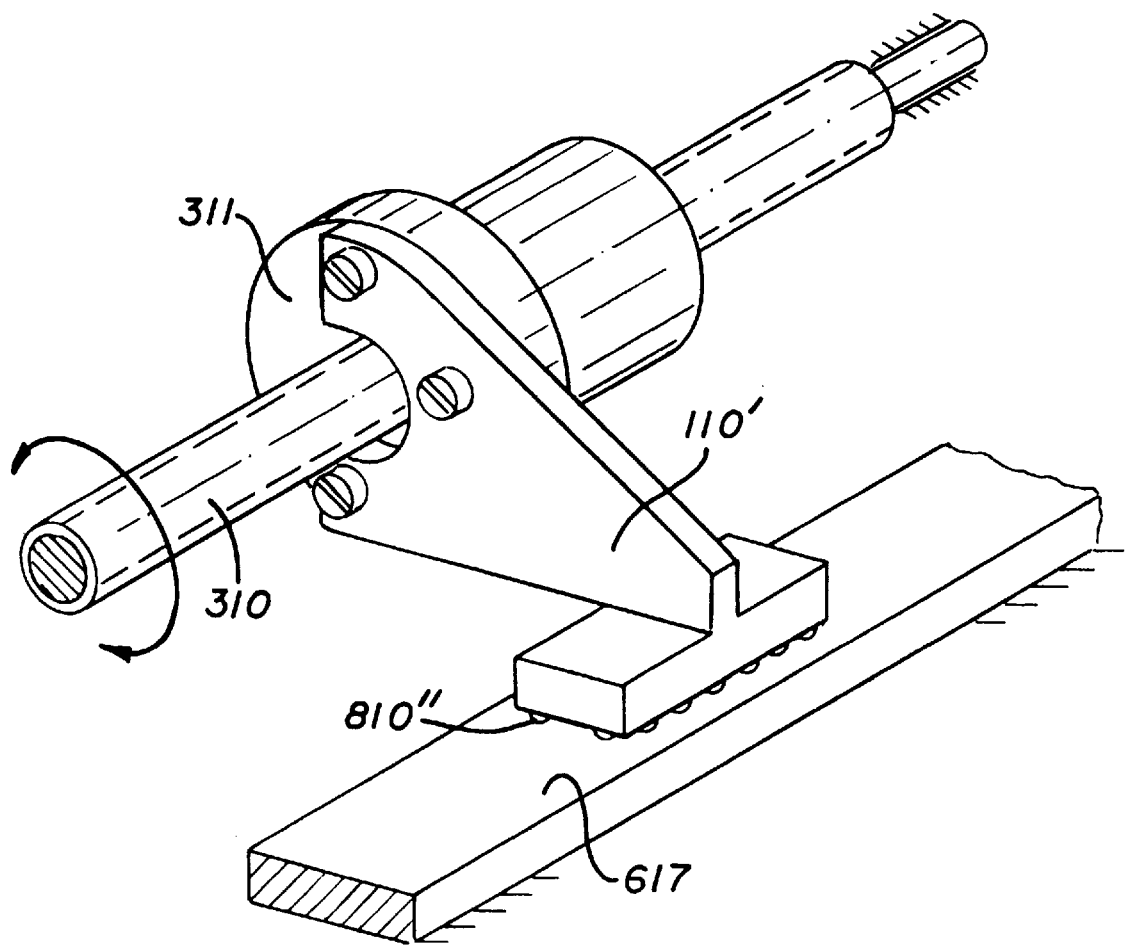
FIG. 35a is a perspective view of the FIG. 35 drive.
Figure 36:
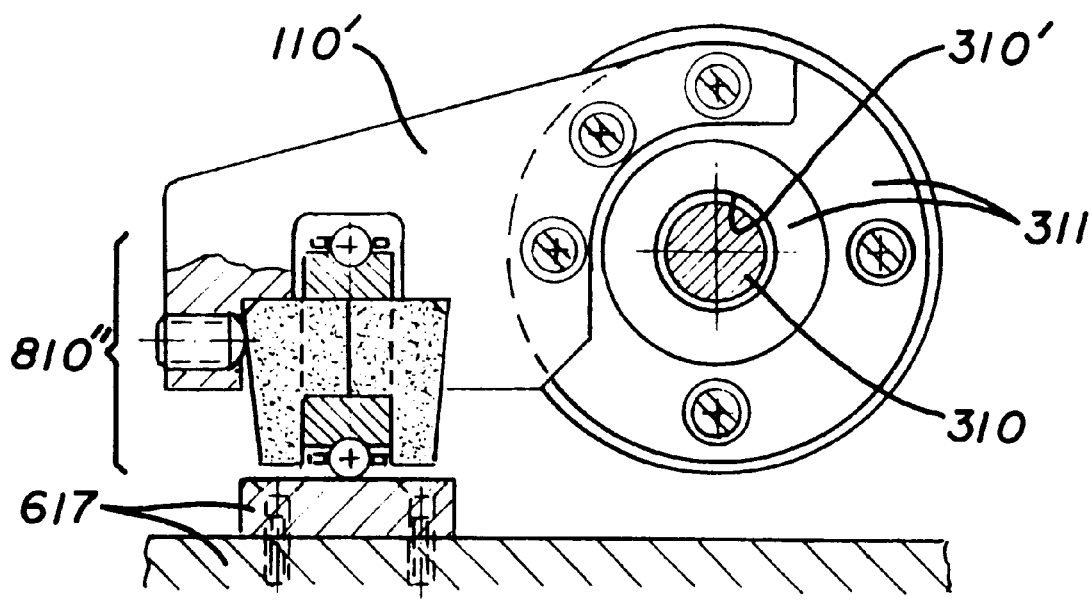
FIG. 36 is an end elevation of the FIG. 35 drive.

One very important special case of the FIG. 34 device is in antirotation outrigger arms such as discussed earlier in connection with FIG. 23. In FIGS. 35, 35a and 36 such an antirotation arm 110' is shown in greater detail; here the engagement of the arm with its guide track 617 is through a WAMB 810".

Since it is the track 617 that controls the arm 110', rather than the converse, this is in effect a form of rotary-arm system in which the body (218 in FIG. 34) controls the shaft (811 in FIG. 34). Here, however, the "shaft" is the ball nut 311, which—but for the engagement with the guide track 617—is free to rotate on or with the screw 310.

14. Overtravel Provisions in a Wobble-Absorbing Magnetic Bearing

If the FIGS. 35–36 arm-and-track system is viewed as a special case of the FIG. 34 rotary drive, however, it does have two important special characteristics:

(1) the final surface of the WAMB 810" is in effect the guide track 617, and the other elements of the WAMB 810" must operate lengthwise along that track; and (2) usually the desired longitudinal travel of an object to be driven by the screw drive greatly exceeds any desired length of the engagement surface of the WAMB 810" along the guide track 617.

In previously detailed discussion of the relative excursions of adjacent surfaces in a WAM bearing, it was noted that such excursions are typically limited by the distance which the balls can roll before falling off the end of an element, or running into a wall at the end of an element. Here the balls will come to the end of the penultimate surface of the WAMB 810" long before the nut 311 can travel its rated distance along the screw 310.

Overtravel of course could be accommodated by using conventional recirculating-ball devices which are available commercially, but these have relatively high energy consumption due to friction of the balls in the recirculating track. Undesired frictional heating can degrade the dimensional stability of the antirotation-bar and thereby the longitudinal precision of the entire ballscrew assembly.

Accordingly my invention contemplates another way of enabling overtravel that entails very little heating—and that is applicable in many other types of systems requiring overtravel. As shown in FIGS. 37 through 40, the WAMB 810" terminates in a penultimate surface which rolls on ferromagnetic (but not necessarily magnetized) balls 11, and these balls in turn roll along the guide track 617.

Figure 37:
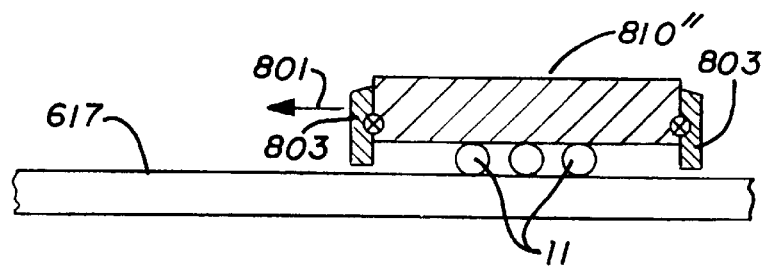
FIG. 37 is a schematic side elevation of portions of the FIG. 35 drive, illustrating an overtravel system and method that form a nineteenth preferred embodiment of my invention.
Figure 38:
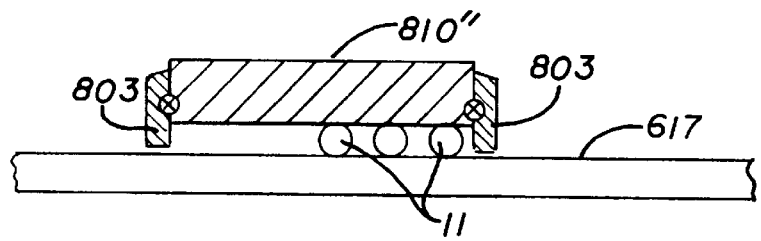
FIGS. 38 through 40 are like views showing the same system and method at successively later stages of use.

From its starting position in FIG. 37 the WAMB 810" is assumed to be moving leftward as indicated by the arrow 801. In FIG. 38 the device is seen to have moved nearly as far as it can, since the right end of the WAMB 810" has nearly reached the rightmost one of the balls 11.

At roughly this point the device is stopped, and two end jacks 803 are lowered 802 (FIG. 39) into contact with the track 617 or, to avoid damaging the track, into contact with a separate supporting-surface strip (not shown) paralleling the track. The jacks 803 are then advanced still further downward relative to the WAMB 810", with the effect of raising 804 the WAMB—and with it the balls 11—very slightly relative to the track 617.

Figure 39:
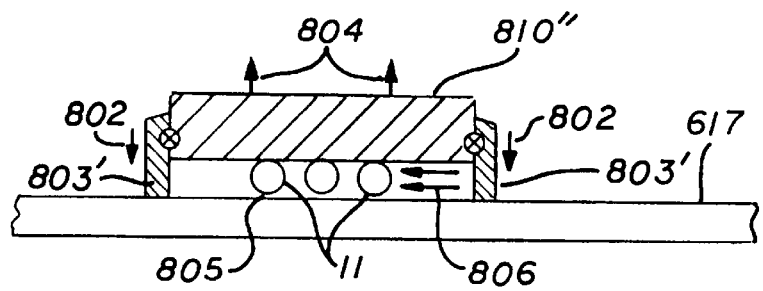
Figure 40:
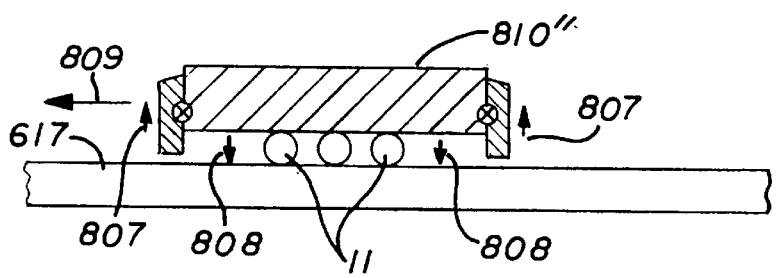

In FIG. 39 the result is exaggerated by showing of a distinct gap 805 between the balls 11 and track 617. Actually it is only necessary to raise the WAMB enough to remove friction (and avoid scratching the facing surfaces). As soon as friction is relieved, the balls 11 will move 806 to recenter themselves in the magnetic field of the penultimate surface of the WAMB 810".

The jacks 803 are then retracted upward 807, lowering 808 the WAMB 810" and balls 11 back into contact with the track 617, and the device is ready to proceed leftward in another incremental advance.

15. Plural Wobble-Absorbing Magnetic Bearings in Parallel

Figure 41:
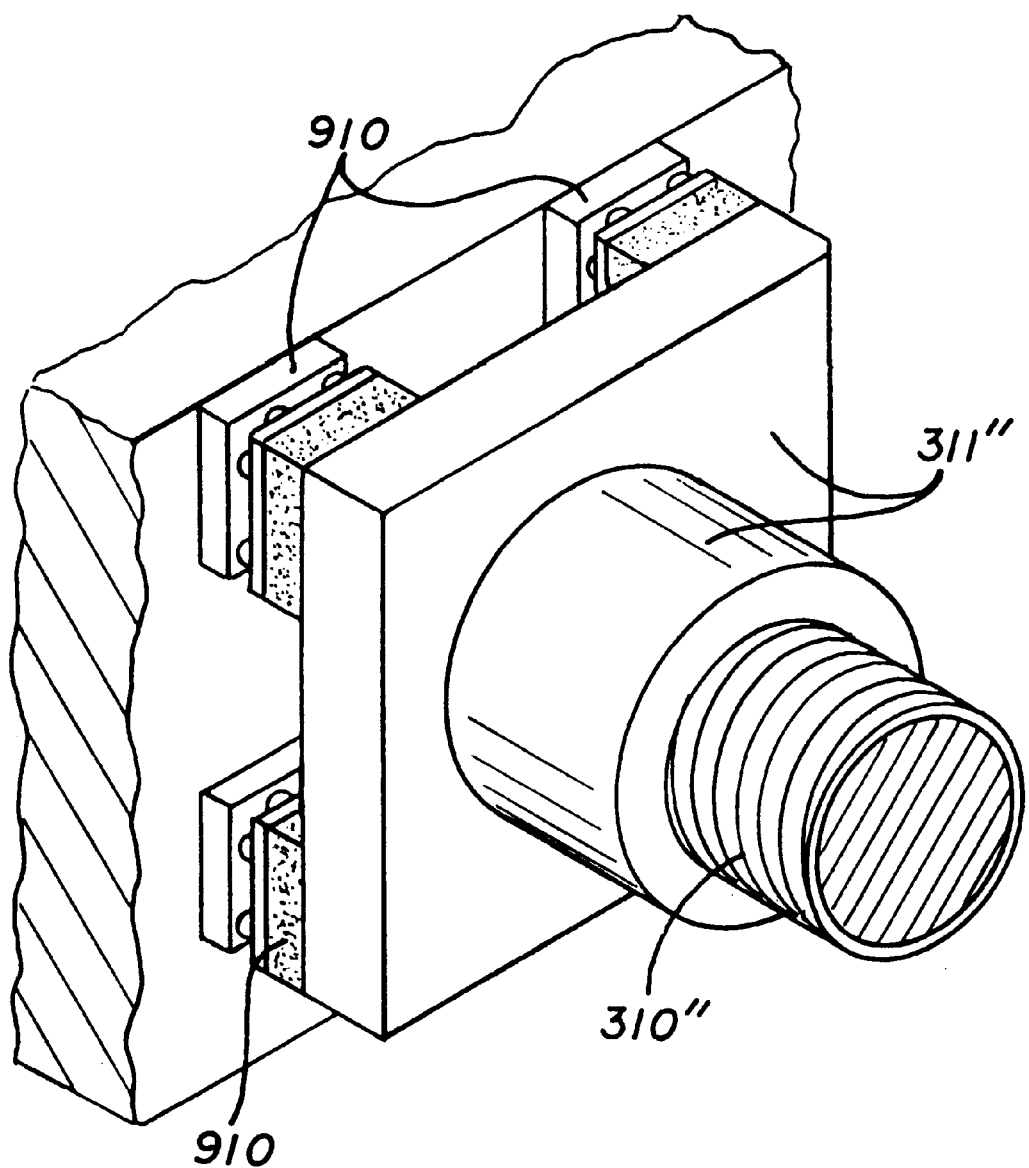
FIG. 41 is a perspective view of a twentieth preferred embodiment of my invention that comprises a jumbo ballscrew drive having plural τ-WAMBs.
Figure 42:
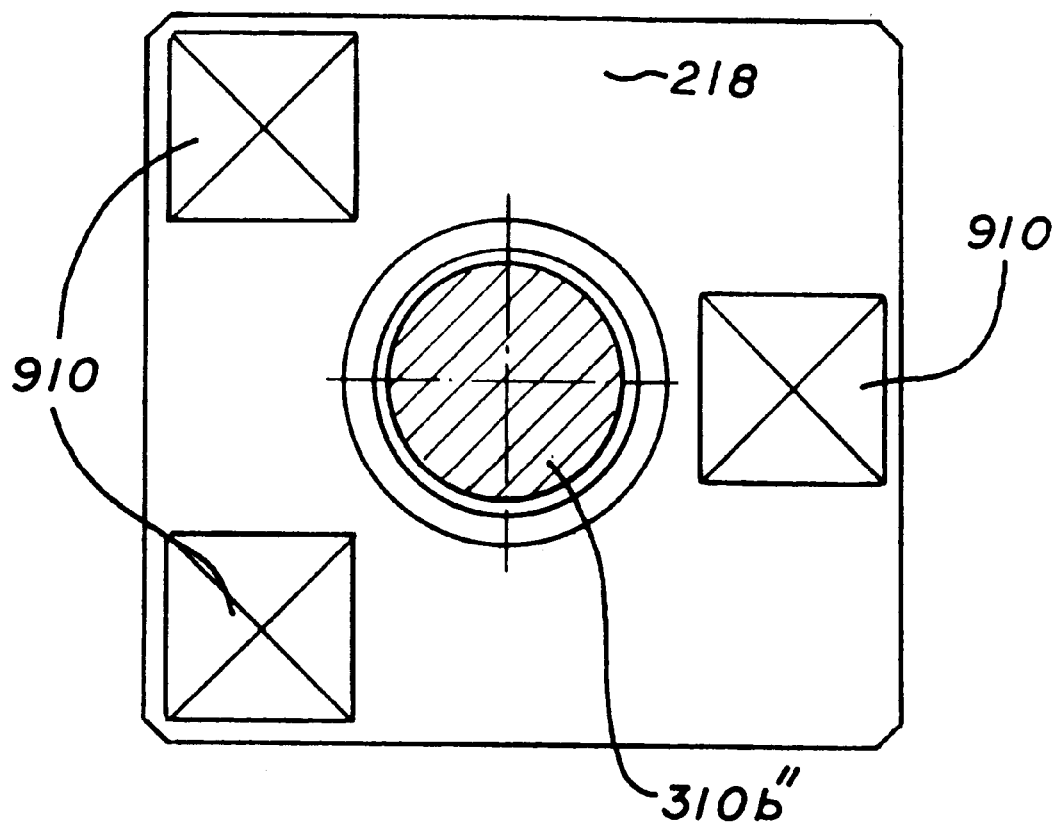
FIG. 42 is a schematic end elevation of a drive/object interface in the FIG. 41 embodiment.

FIGS. 41 and 42 show another way in which WAMBs can be used in an in-line drive environment. Here the application is very large or "jumbo" ballscrew assembly 310"–311", linearly driving a correspondingly large object 218.

Three $\tau$-WAMBs 910 of moderate size are spotted at the engagement interface between the ball nut 311" and the surface 218. The three WAMBs 910 should include spherical or crossed-cylindrical stages to accommodate anticipated angular imperfections at both sides of the mounting interface.

16. Permanent-Magnet Balls and Rollers

Figure 43:
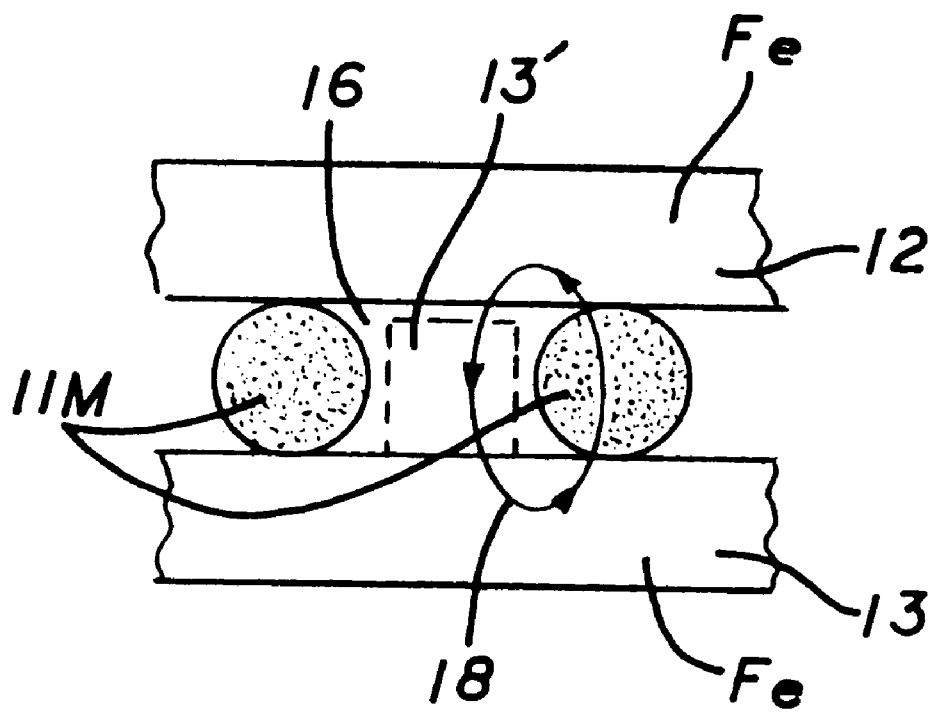
FIG. 43 is a schematic elevational view of a WAMB that is a twenty-first preferred embodiment of my invention and that has rolling elements that are permanent magnets.

FIG. 43 shows that a basic WAMB element can be made using ferromagnetic surface elements 12, 13 held tightly together by a magnetic field 18 which is produced by a permanent magnet 11m in the form of a cylinder or a spherical ball. Here the balls or cylinders 11m clamp the two surfaces 12, 13 to themselves, rather than being clamped between the surfaces.

If desired the flux can be concentrated and a finer airgap 16 formed by adding a metal step 13' to one surface element 13; the step can be in the center of the assembly as shown, or steps can be provided near the ends, etc.

Some limitations of permanently magnetized rolling elements have already been set forth. They are particularly desirable in configurations favoring their extreme hardness, longevity, high-temperature compatibility, and corrosion resistance—but not long travel.

FIG. 43a shows a steel sleeve that is shrink-fitted about the cylindrical exterior of a permanent-magnet roller for use in the FIG. 43 device.

17. Magnetic Safeties in Wobble-Absorbing Magnetic Bearings

FIGS. 44 and 45 depict a tongue-and-groove type of τ-WAMB 1015a–b–c, related to the unit 510 shown in FIG. 15 and also to the crossed-flanges type of τ-WAMB covered in the second of my previously mentioned patent documents. The device of FIGS. 44 and 45 can be used in various applications, including the holding of a nut 311 against rotation relative to a table—as discussed earlier in this document and also in my earlier patent documents.

This FIGS. 44-45 device differs from those discussed previously in being for use with a particularly heavy-duty load-carrying (but still high-precision) ballscrew 310–311, and in having at least one auxiliary safety retaining magnet 1017. This magnet 1017, appearing near the right side of the assembly, is weaker than the main τ-WAMB functioning magnet 17 shown at the left side of the assembly.

In a heavy-duty environment, torque and forces developed with the system under unusually heavy load can sometimes momentarily exceed the magnetic forces that hold the WAMB together. This is quite unusual, but if it does happen it can cause significant damage to various precision-tooled surfaces—even including the compound and very expensive surfaces of the ballscrew 310 and nut 311.

The auxiliary retainer magnet 1017 functions as a safety, to keep the assembly together—and in a nondamaging configuration—in event of excess load causing the magnetic assembly to break loose. In such situations ordinarily the mechanism is not moving rapidly, and anyway usually is immediately stopped by a sensor and automatic control interlock system; therefore simply preventing the pieces from falling against each other suffices to avoid damage.

18. Conclusion

Many other modifications may be made by combining various ones of the features illustrated herein, and there are also modifications which will be evident from the described concepts of the invention.

The invention has been disclosed in detail in order to comply with the requirements of the patent laws. The scope of the invention, however, is to be measured only in accordance with the appended claims.

I claim:

1. A wobble-absorbing magnetic bearing for a drive system that applies force from a driving mover to move a driven object; said bearing comprising:
a driving bearing element having a first surface;
a driven bearing element having a second surface that faces the first surface along a drive direction;
rolling elements disposed between the first and second surfaces to:
enable the driving and driven bearing elements to move substantially freely, relative to each other, along at least one direction transverse to the drive direction, and
transmit drive forces along the drive direction from the driving bearing element to the driven bearing element;
means for receiving driving contact from such driving mover at the driving bearing element;
means for applying driving contact from the driven bearing element to such driven object; and
means for applying magnetic force to hold the bearing elements together against the rolling elements.

2. The bearing of claim 1, wherein:
at least one of the bearing elements comprises a permanent magnet;
the magnetic force-applying means comprise said permanent magnet; and
the rolling elements are fully rolling along both surfaces, including the surface of the bearing element that comprises the permanent magnet.

3. The bearing of claim 2, wherein:
the permanent magnet is a ceramic magnet.

4. The bearing of claim 2, wherein:
the permanent magnet is a ceramic magnet; and
the bearing element that comprises the permanent magnet further comprises a facing between the ceramic magnet and the rolling elements, to protect the ceramic magnet.

5. The bearing of claim 1, wherein the magnetic means tend to create a magnetic restoring force against relative transverse movement of the driving and driven bearing elements from a generally centered configuration; and further comprising:
means for maintaining the magnetic restoring force at a relatively low level, for small relative transverse movements;
said low-restoring-force maintaining means comprising a transverse dimension of one of the surfaces that is significantly greater than a transverse dimension of the other of the surfaces.

6. The bearing of claim 1, in further combination with a drive system for applying force from a driving mover to move a driven object; said combination comprising:
a driving mover;
power input means for engaging and providing driving contact from the driving mover to the driving-contact receiving means;
power output means for engaging and receiving driving contact from the driven-contact applying means to such object.

7. The combination of claim 6, further comprising:
a driven object secured to the power output means.

8. The bearing of claim 1, further comprising:
structure defined in at least one of the bearing elements for limiting the free relative movement of the surfaces with respect to at least one degree of freedom.

9. The bearing of claim 8, wherein:
said structure has an aggregate effect of enabling transmission of torque through the bearing.

10. The bearing of claim 8, wherein:
said movement-limiting structure comprises at least one V-groove for constraining associated rolling elements with respect to their direction of free relative movement.

11. The bearing of claim 10, wherein:
said structure has an aggregate effect of enabling transmission of torque through the bearing.

12. The wobble-absorbing magnetic bearing of claim 1, further comprising:
a third bearing element defining, with at least one of the driving and driven bearing elements, an additional pair of mutually facing bearing surfaces; and associated with the additional pair of surfaces, rolling elements disposed between the additional mutually facing pair of surfaces to facilitate substantially free relative movement of the additional pair of surfaces along at least one direction transverse to the drive direction;

the additional mutually facing surface pair, with its associated rolling elements, respectively conferring on the bearing at least one degree of freedom.

13. The bearing of claim 12, further comprising:

structure defined in at least some of the bearing elements for limiting the free relative movement of the surfaces with respect to at least one degree of freedom.

14. The bearing of claim 13, wherein:

said structure has an aggregate effect of enabling transmission of torque through the bearing.

15. The bearing of claim 13, wherein:

said movement-limiting structure comprises at least one V-groove for constraining associated rolling elements with respect to their direction of free relative movement.

16. The bearing of claim 15, wherein:

said structure has an aggregate effect of enabling transmission of torque through the bearing.

17. The bearing of claim 12, in further combination with a drive system for applying force from a driving mover to move a driven object; said combination comprising:

a driving mover;

power input means for engaging and providing driving contact from the driving mover to the driving-contact receiving means;

power output means for engaging and receiving driving contact from the driven-contact applying means to such object.

18. The combination of claim 17, further comprising:

a driven object secured to the power output means.

19. A wobble-absorbing magnetic bearing for a drive system that applies force from a driving mover to move a driven object; said bearing comprising:

a driving bearing element having a first surface;

a driven bearing element having a second surface that faces the first surface along a drive direction;

rolling elements made of nonmagnetic material and disposed between the first and second surfaces; and means for applying magnetic force to hold the bearing elements together against the rolling elements.

20. The bearing of claim 19, further comprising:

retainer means for holding the rolling elements separate from each other and between the first and second surfaces.

* * * * *